United States Patent [19]

Rozenwaig et al.

[11] Patent Number: 4,641,376
[45] Date of Patent: Feb. 3, 1987

[54] MULTI-CHANNEL MULTI-CELL OPTOELECTRONIC SWITCHING NETWORKS FOR MULTI-SERVICE TELECOMMUNICATIONS SYSTEMS

[76] Inventors: Boris Rozenwaig, 8, rue P.J. Redouté 92360 Meudon-la-Foret; Yves Robin-Champigneul, 4, rue Georges Ville, 75116 Paris, both of France

[21] Appl. No.: 769,808

[22] Filed: Aug. 27, 1985

Related U.S. Application Data

[63] Continuation of Ser. No. 490,234, Apr. 29, 1983, abandoned.

[30] Foreign Application Priority Data

Apr. 30, 1982 [FR] France ............................ 82 07589

[51] Int. Cl.⁴ .............................................. H04B 9/00
[52] U.S. Cl. ..................................... 455/607; 250/578; 455/617
[58] Field of Search ............... 455/600, 601, 606, 607, 455/617; 370/1, 3, 4; 250/551, 578

[56] References Cited

U.S. PATENT DOCUMENTS

| 4,074,142 | 2/1978 | Jackson | 250/551 |
| 4,229,071 | 10/1980 | d'Auria | 250/578 |
| 4,481,510 | 11/1984 | Hareng et al. | 250/551 |
| 4,512,036 | 4/1985 | Laor | 455/607 |

FOREIGN PATENT DOCUMENTS

| 2295666 | 7/1976 | France | 455/600 |
| 2489643 | 3/1982 | France | 455/606 |

OTHER PUBLICATIONS

Gfeller–Optical Multiplexing–IBM Tech. Discl. Bull., vol. 22, No. 1, Jun. 1979, pp. 345, 346.

Primary Examiner—Joseph A. Orsino, Jr.
Attorney, Agent, or Firm—Lowe, Price, LeBlanc, Becker & Shur

[57] ABSTRACT

An optoelectronic switching network for multi-service wide-band telecommunications systems includes, on the one hand, a selector board (receiver or emitter) carrying plural compound optoelectronic units (selector units) each including a matrix of optoelectronic cells (photo diodes or light emitting diodes) and cell selection means and, on the other hand, a board (emitter or receiver) carrying plural optoelectronic units (conjugated units) optically conjugated with each compound unit of the selector board. To reduce the number of selector units, the selection means of each selector unit include means for respectively connecting cells, each of which is selected in a zone among plural zones from the matrix, to the links of plural channel links connected to the selector unit.

10 Claims, 54 Drawing Figures

FIG.1 *(PRIOR ART)*
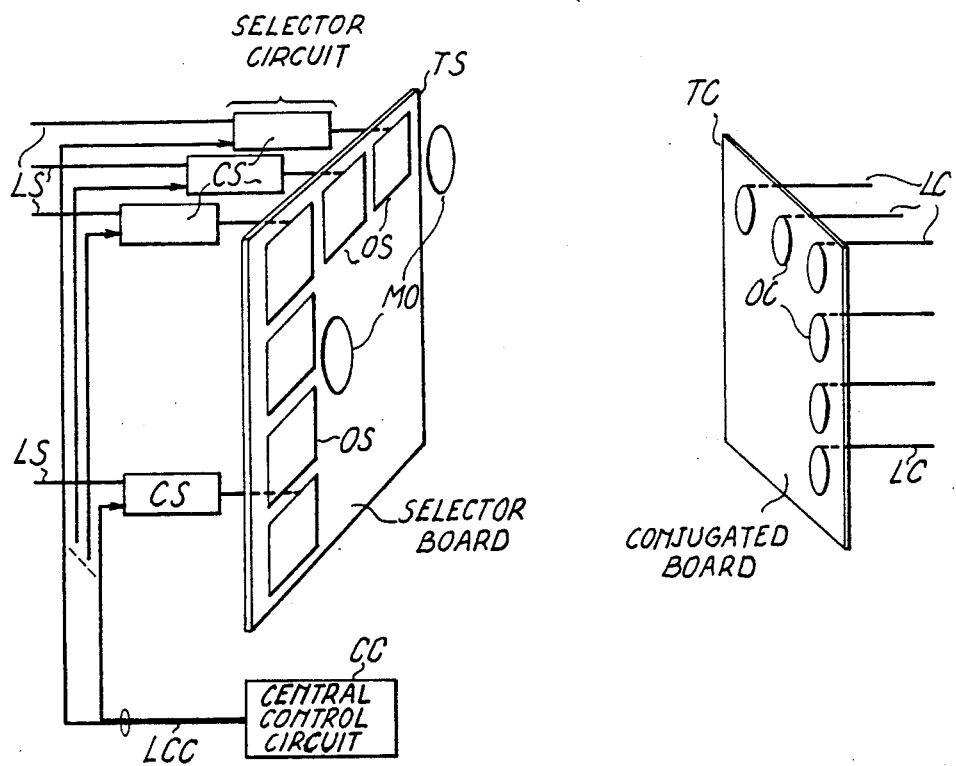
FIG.2 *(PRIOR ART)*
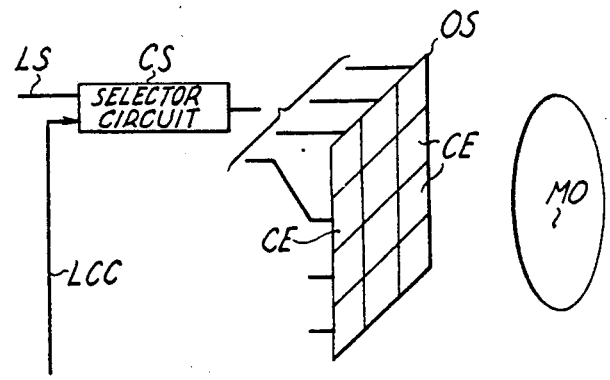

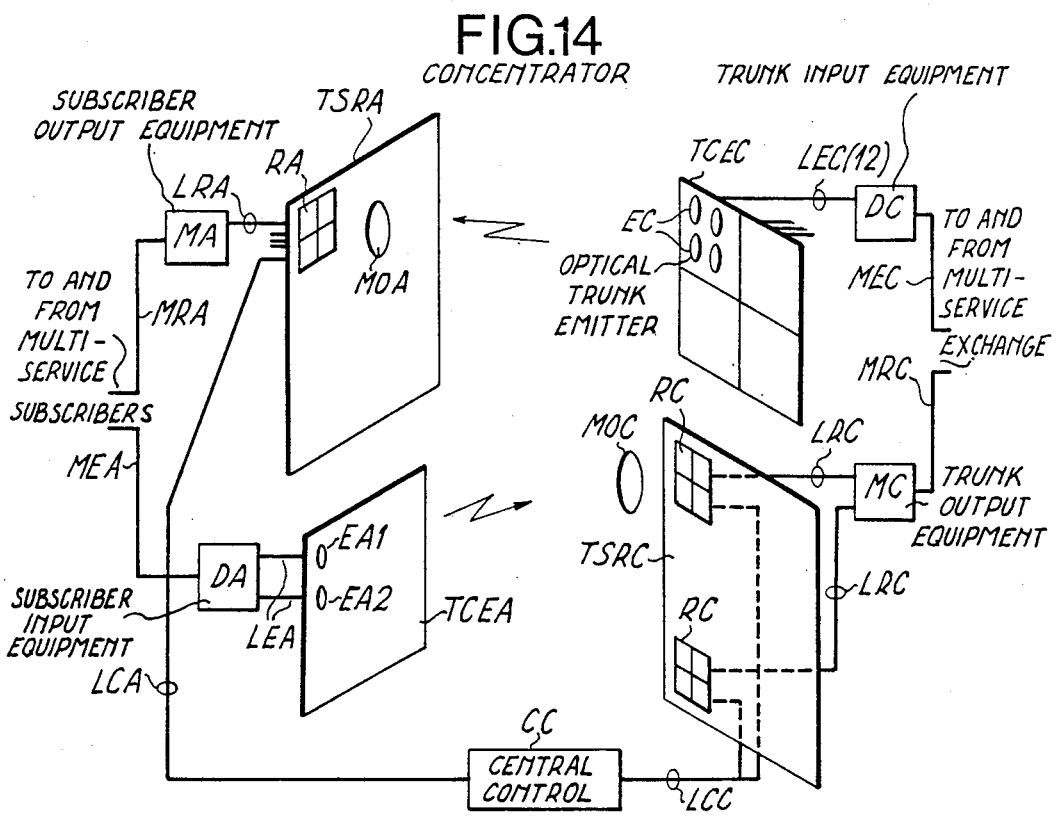
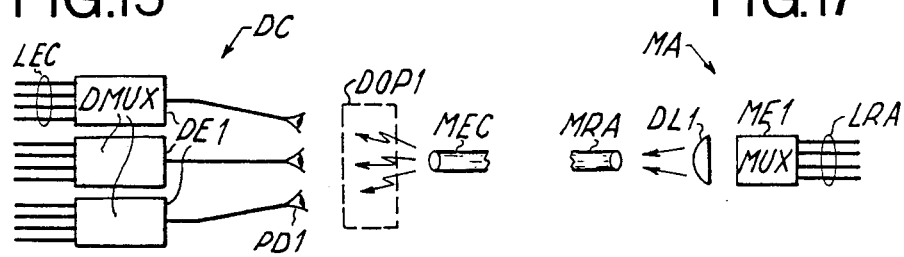
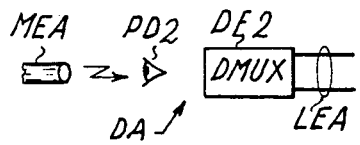
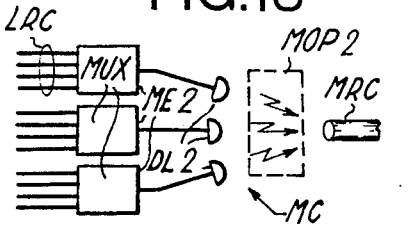

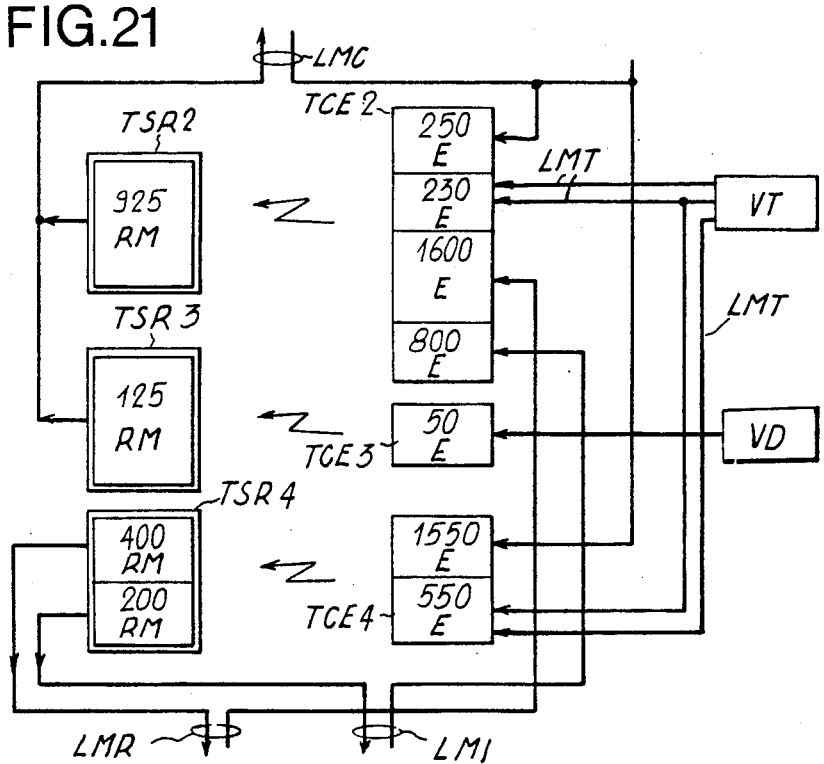
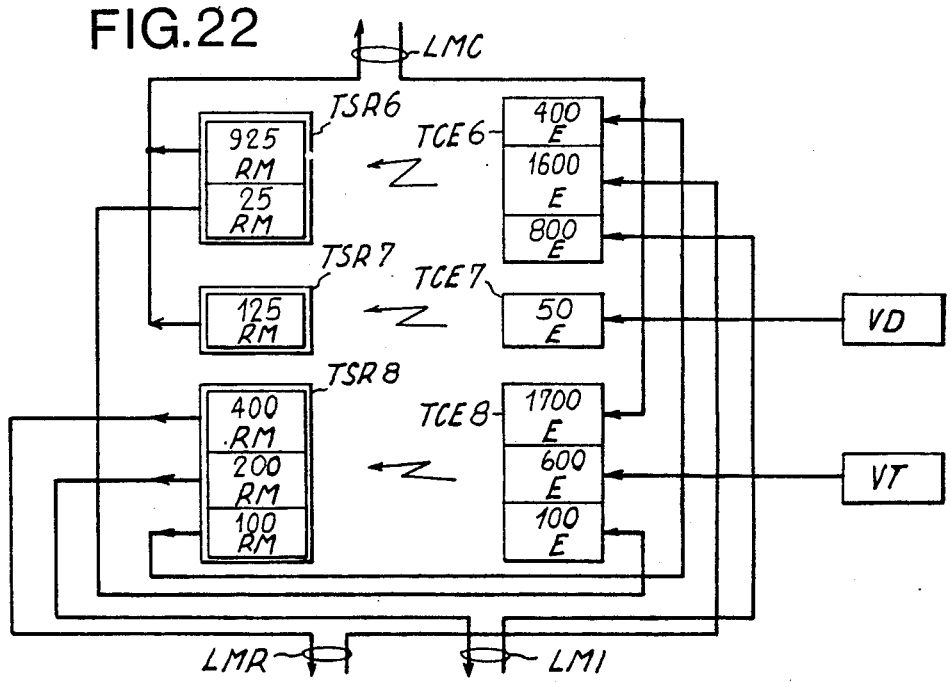

MULTI-CHANNEL MULTI-CELL OPTOELECTRONIC SWITCHING NETWORKS FOR MULTI-SERVICE TELECOMMUNICATIONS SYSTEMS

This application is a continuation of application Ser. No. 490,234, filed Apr. 29, 1983 now abandoned.

BACKGROUND OF THE INVENTION

1. Field of the Invention

The invention relates, generally speaking, to optoelectronic switching networks intended, in wide-band cabled telecommunications systems, for switching the modulated signals of one incoming channel in a plurality of incoming channels over to one outgoing channel in a plurality of outgoing channels.

The wide-band telecommunications systems involved herein are of the "multi-service" type in that they permit:

the diffusion of motion picture programs to subscribers from television stations and video-broadcasting stations (video-libraries in particular) as well as the transmission of information to these stations (calls, opinion surveys, etc. . . . ) from subscribers, such diffusion then being called "inter-active";

the transmission of data to subscribers at their request from administrative bodies, service distributors, data banks, etc. . . . ;

téléphone and videophone communication between subscribers; etc. . . .

2. Description of the Prior Art

The type of known optoelectronic switching networks to which the invention applies comprises:

an emitter board including an assembly of light emitting optoelectronic units termed "emitter units" which are connected to incoming channels and which emit modulated light signals the intensity of which reproduces the modulation of the signals routed via the said incoming channels;

a receiver board including an assembly of light receiving optoelectronic units termed "receiver units" all of which can be illuminated by the emitter board and which transmit signals to outgoing channels where the intensity of such signals reproduces the modulation of at least one light signal among those to which the said receiver units are exposed.

For at least one given incoming channel to be switched to at least one given outgoing channel, units referred to as "selector units" are provided in one of the emitter or receiver boards, the board which comprises the selector units being referred to as "selector board". Each selector unit comprises an array of elementary optoelectronic components (light receivers or emitters depending on the case) referred to as multi-cells equal in number to the number of units (light emitters or receivers depending on the case) referred to as "conjugated units" of the other board referred to as "conjugated board", optical means providing optical conjugation of at least one of the cells with one of the conjugated units and selection means making it possible to switch at least one cell onto one channel of the said selector unit.

A known optoelectronic switching network of this nature may belong to one or to the other of two categories.

In an optoelectronic switching network falling into the first category, known in particular through U.S. Pat. No. 4,437,190 (FIGS. 1-14, inclusive), the selector board is the receiver board. The receiver units of the said receiver board are termed "multi-cell receivers". The receiver cells which form the receiver units are for instance photodiodes. The conjugated units in the conjugated emitter board are for instance light emitting diodes or laser diodes.

In an optoelectronic switching network coming under the second category, known in particular through U.S. Pat. No. 4,437,190 (FIGS. 15-26 inclusive), the selector board is the emitter board. The emitter units of the said board are termed "multi-cell emitters". The emitter cells from these multi-cells emitters are for instance light emitting diodes or laser diodes. The conjugated units in the conjugated receiver board are for instance photodiodes.

Whatever the category under consideration, it is advantageous for the array of conjugated units in the conjugated board to form a matrix, i.e. that these conjugated units lie in rows and columns. Indeed, this lay-out makes it possible to arrange the cells of each selector unit of the selector board in matrix form and therefore to simplify the design of the selection means in the said selector unit since to optically activate a cell to be switched to the channel associated with the said selector unit cell, it is sufficient to select the row and column to which it belongs. The lay-out of the selector units into random-access matrix-form integrated circuits in which the selection means are themselves advantageously integrated, is thereby greatly eased.

Furthermore, whatever the category being considered, the incoming or outgoing signals can be electrical, in which case the channels are for example coaxial cables, or optical, in which case the channels are optical fibers. Whether the signals are electrical or optical, they can be in analog or digital form. Lastly, they can be multiplexed.

To conclude, whatever the category being considered, these optoelectronic switching networks of the known type are able to build up several simultaneous communications from different calling parties to different called parties. However, they are unable to build up several simultaneous communications between one and the same calling party and plural called parties and several simultaneous communications between plural calling parties and one and the same called party. This is because the selector unit has only one access (input or output) per subscriber.

SUMMARY OF THE INVENTION

An object of this invention is to provide an optoelectronic switching network of the aforementioned type which is intended for a multi-service telecommunications system. In accordance with one aspect of the present invention, an optical switching network selectively couples plural input information signals from a multi-service exchange that derives the information signals to plural subscriber stations. The switching network comprises an array of optical transmitting cells responsive to the input signal so that an optical signal is derived by one of the cells in response to the information in each information signal. An array of optical receiving cells responds to the optical signals derived by the transmitting cells. The receiving cell array is divided into plural zones, each including at least the same number of cells as in the transmitting cell array. Optical projection means is situated between the arrays so there is a correspondence of the information signals from the cells of the transmitting array with cells of each zone of the receiving array. Each receiving cell derives a first signal that represents the optical signal incident thereon. The first signals of each zone are selectively coupled to a single output so that one output is provided for each zone. The outputs of the plural zones are combined onto a single signal transmitting structure that is coupled to the plural subscriber stations.

In accordance with a further aspect of the invention, an optical switching network selectively couples plural information signals to a multi-service exchange from plural subscriber stations, each of which derives plural information signals. The network comprises an array of optical transmitting cells responsive to the input signal so that an optical signal is derived by a plurality of the cells in response to the information in the plural information signals for each subscriber station. An array of optical receiving cells responds to the optical signals derived by the transmitting cells. The receiving cell array is divided into plural zones, each including at least the same number of cells as in the transmitting cell array. Optical projection means is provided between the arrays so there is a correspondence of the information signals from the cells of the transmitting array with cells of each zone in the receiving array. Each receiving cell derives a first signal that represents the optical signal incident thereon. The first signals of each zone are selectively coupled to a single output so that one output is provided for each zone. The outputs of the plural zones are combined onto a single signal transmitting structure that is coupled to the exchange.

Should the selector board be the receiver board, then each of its multi-cell receiver units may then advantageously comprise multiplexing means making it possible to route the signals delivered by the outputs of the said receiver unit via one and the same outgoing transmission line. The conjugated emitter board can for its part advantageously comprise demultiplexing means making it possible to have the signals extracted from an incoming multiplex channel routed along a single incoming transmission line to as many emitter units.

Should the selector board be the emitter board, each of its multi-cell emitter units can then advantageously comprise demultiplexing means making it possible to route the signals extracted from an incoming multiplex line to the input channels of the said multi-cell emitter unit. The conjugated receiver board for its part can advantageously comprise multiplexing means making it possible to route a multiplex of the signals delivered by at least two receiver units to the same outgoing transmission line.

BRIEF DESCRIPTION OF THE DRAWINGS

Further advantages of the invention are described in the embodiment examples which follow, with reference to the appended drawings in which:

FIG. 1 is a synoptic drawing of an optoelectronic switching system of the prior art, of the type to which the invention switching system belongs, FIG. 2 is a schematic diagram of a selector unit of the prior art acting on the selector board.

FIG. 14 is a synoptic drawing of a switching network (concentrator) with receiver-selector boards and conjugate emitter boards in accordance with the invention (example C1), FIGS. 15 and 16 are block diagrams of demultiplexers associated with the selector units or conjugates units of the switching network of FIG. 14, FIGS. 17 and 18 are block diagrams of multiplexers associated with the selector units or conjugates units of the switching network of FIG. 14, FIG. 21 is a symbolic diagram of a variation of the local exchange of FIG. 20 (example C3), FIG. 22 is a symbolic diagram of a further embodiment of the local exchange of FIG. 20 (example C4)

DETAILED DESCRIPTION OF THE PREFERRED EMBODIMENTS

Figure 3:
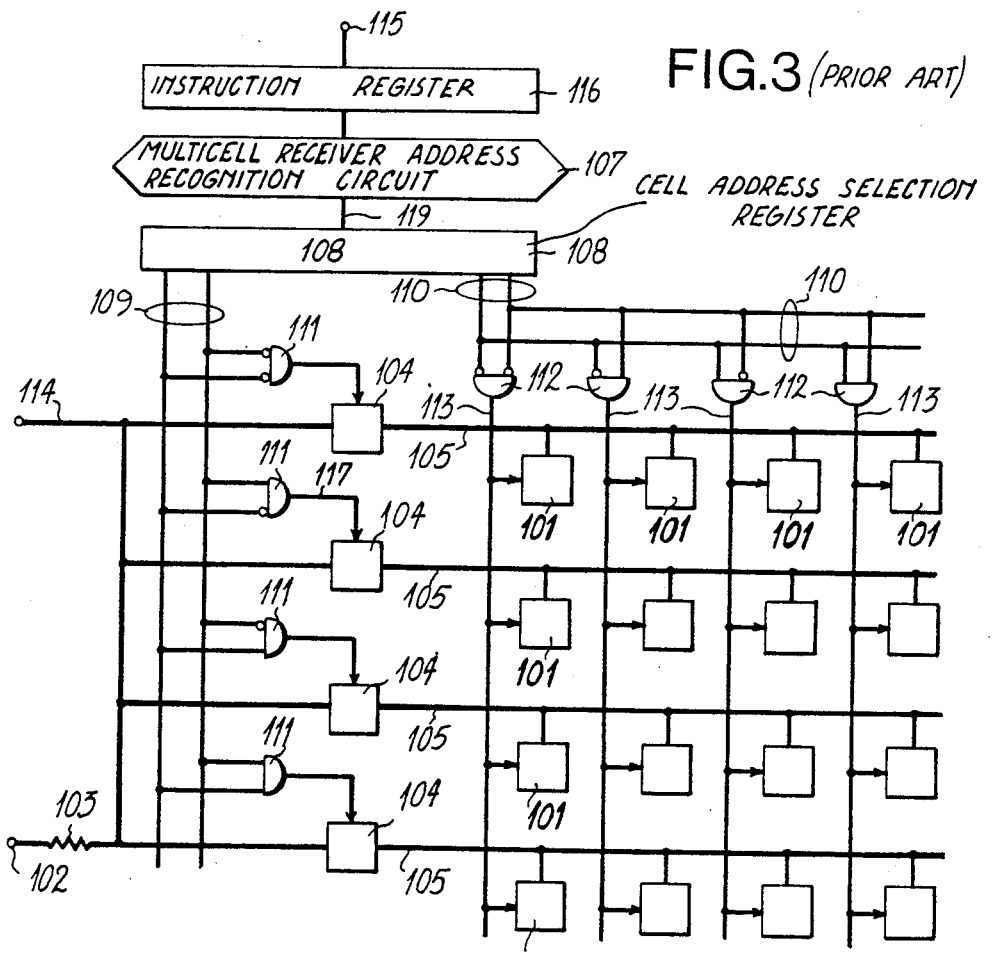
FIG. 3 is a block diagram showing such a selector unit of the prior art designed in the form of an integrated component and used as a receiver.

The embodiment examples of switching networks in accordance with the invention are described only in connection with the essential points of the devices, with the necessary comments required to understand the examples.

The central control device, for instance, is depicted in the form of simple blocks or are quite simply not even shown. The reason behind this lies in that as far as the multi-channel optoelectronic switching networks of the invention are concerned, the electronic or optoelectronic provisions set forth in the aforesaid U.S. Patent can be purely and simply incorporated in order to transmit for example addresses or subscriber call numbers for controlling the emitter or receiver selector units etc. . . .

Likewise, no mention has been made of the electromechanical or optoelectronic provisions which makes it possible to integrate the emitter or receiver selector units and the optical members thereof to constitute viewers with a manual or automatic orientation adjuster; these provisions are dealt with in detail in the afore-mentioned U.S. Patent and may be advantageously applied to the selector boards (receivers or emitters) of the switching network of the invention.

Consideration is given simultaneously to FIGS. 1 and 2 which recap the prior art.

The selector board TS groups together an array of optoelectronic units OS which will be described later, each of which is connected to a line LS capable of conveying an electrical or optical modulated signal. The conjugated board TC groups together an array of optoelectronic units OC each of which is connected to a line LC capable of conveying an electrical or optical modulated signal.

Optical members composed of objective lenses MO associated with the units OS provide the optical conjugation of each of these units with the conjugated board TC assembly.

Two main forms of embodiment are possible.

In the first form of embodiment, each of the units OC of the conjugated board TC is a light source which delivers a luminous flux whose intensity is modulated by the signal conveyed via the associated line LC which is here an incoming line. Each of the units OS of the selector board TS is a compound light receiver unit made up of as many elementary light receiving cells as there are units OC included in the conjugated board TC. Every cell CE (see FIG. 2) of a unit OS receives the image of one of the units OC in the board TC by means of the optical system MO associated with the unit OS. It delivers an electrical or optical signal through its output, reproducing the modulation of the light flux that it receives from the said unit OC. According to the accepted terminology, the units OS are "multi-cell" receivers.

In the second form of embodiment, every unit OC on the conjugated board TC is a light receiver which, through its output, delivers an electrical or optical signal to the association line LC which is here an outgoing line. This signal reproduces the modulation of the light flux which hit it. Every unit OS on the selector board TS is a compound light emitted composed of as many elementary light emitter cells as there are units OC making up the conjugated board TC. Each cell CE of a unit OS projects its image, by means of the optical system MO associated with this unit, onto one of the units OC in the conjugated board TC and delivers a light flux to this unit the intensity of which is modulated by an electrical or optical signal delivered to the input of the said cell. According to the accepted terminology, the units OS are "multi-cell" emitters.

In both forms of embodiment, each selector unit OS on the selector board TS is connected to the line LS with which it is associated via a selector circuit CS that executes the orders delivered by the central control circuit CC (links LCC) in order to connect at least one of the cells CE of the said selection unit OS to the said link LS.

It will be recalled that the selection (CS) and emission or reception (OS) functions can be advantageously integrated within the same emitter or receiver component.

Consequently, whatever the form of embodiment taken into consideration, the switching network makes it possible to connect one link LC to one link LS at most. To be more precise, the first form of embodiment makes it possible to switch an incoming link LC over to at most one outgoing link LS while the second form of embodiment makes it possible to switch at most one incoming link LS over to one outgoing link LC.

Figure 4:
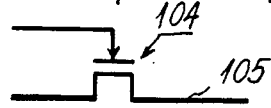
FIG. 4 depicts a switch included in the integrated component.
Figure 5:
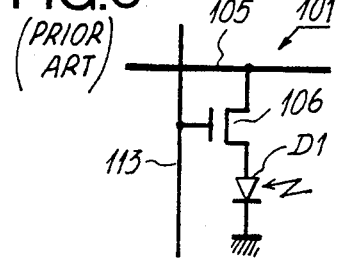
FIG. 5 depicts a receiver cell in the integrated component.

The breakdown will now be given, for memory's sake, with consideration lent to FIGS. 3, 4 and 5 of a random access addressable matrix of elementary optoelectronic receivers (photodiodes) usable as a multi-cell receiver unit in an optoelectronic switching network in accordance with the first form of embodiment described hereinabove. FIGS. 3, 4 and 5 pertain to prior art.

The cells 101 are set out in a matrix arrangement, i.e. in rows and columns. Each of them comprises a photodiode D1 whose cathode is grounded and whose anode is connected to the supply terminal 102 via a resistor 103 common to all the receiver cells, a row control switch 104 and a bus 105. A cell switch 106 is assigned to the said photodiode D1. The switches 104 and 106 are field-effect transistors (see FIGS. 4 and 5) that are normally blocked.

To select a cell 101, the selection circuit CS of the multi-cell receiver unit to which this cell pertains acts on an order from the central control circuit CC. This order is transmitted in the form of a series digital signal comprising a pair of addresses, namely an address identifying the multi-cell receiver unit in the selector board and an address that in the matricially arranged multi-cell receiver unit identifies that cell which is optically conjugated with the emitter OC of the conjugated board TC with which an optical connection must be established. The selector circuit CS therefore comprises, for instance:

a register 116 memorizing the orders transmitted by the central control circuit CC (FIG. 1) through terminal 115;

a receiver address recognizing circuit 107 whose input is connected to the register 116 and which transmits the cell address in the form of a pair of addresses only if the receiver address corresponds to that stored in the said register;

a cell selection register 108 having an input is connected via lead 119 to the output from the circuit 107 and which retransmits the cell address (that it receives from the latter) in the form of a parallel word in which the high weight bits express for example the address of that row to which the cell in question belongs and the low weight bits express the address of that column to which the said cell belongs;

a bus 109 and a bus 110 which respectively convey the row and column address bits;

a plurality of row address decoding circuits 111 (composed of AND gates with appropriate direct and inverse inputs) each of which flips the switch 104 to which it is connected via a row control bus 117, when the corresponding row address is transmitted by the bus 109;

a plurality of column address decoding circuits 112 (designed in the same fashion as the circuits 111) each of which flips the switches 106 (FIG. 5) to which it is connected via a column control bus 113, when the corresponding column address is transmitted by the bus 110.

It can immediately be observed that the photodiode D1 defined by a given address transmitted by the cell selection register 108 is reverse biased by the dc voltage source at terminal 102 via the resistor 103, the switch 106 of the cell in question and the switch 104 in the row to which the said cell belongs. The output current transmitted by the information output terminal 114 is thus determined by the photoelectric current of only the photodiode in question, depending on the illumination thereof.

As the drawing in FIG. 3 comprises only four rows and four columns, i.e. sixteen cells, two row address bits and two column address bits, i.e. four gates 111 having two inputs and four gates 112 having two inputs, suffice for selecting one of these cells. In fact, the number of cells, i.e. the number of rows and columns, is limited only by technological feasibility and dimensional considerations since the number of AND gates 111 and 112 and the number of their inputs merely have to be increased to decode higher address numbers.

Figure 6:
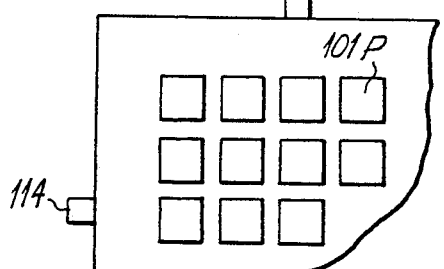
FIG. 6 is a partial view of the integrated component.

The entire configuration in FIG. 3 may be designed in the form of a single integrated circuit. FIG. 6 illustrates the illuminated side of this circuitry. This drawing highlights the photosensitive areas 101P of the cells 101, the strip 114 (information output terminal) and the strip 115 (circuit 116 input). The supply and ground connection terminals have not been shown.

Figure 7:
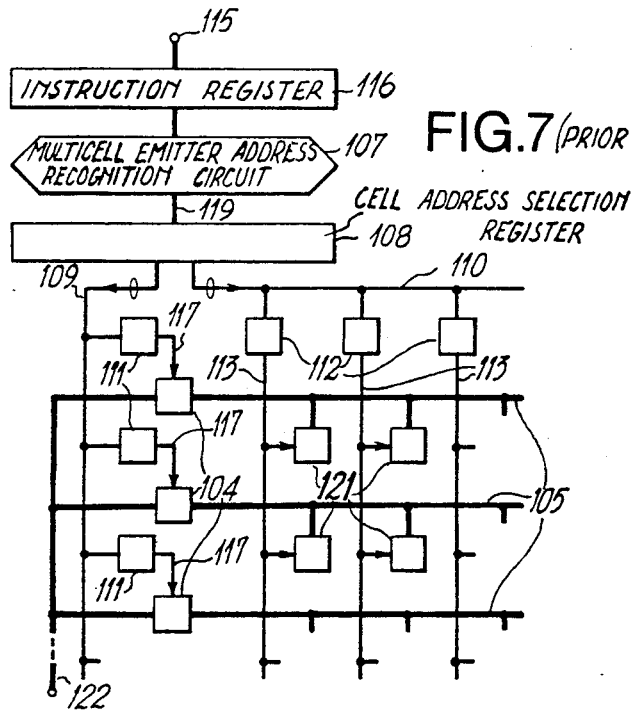
FIG. 7 is a block diagram showing a first embodiment of such a selector unit in the form of an integrated component usable as an emitter.
Figure 8:
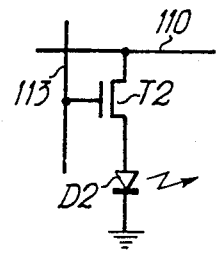
FIG. 8 is a diagram of an emitter cell of the integrated component.

FIGS. 7 and 8 depict as a reminder the breakdown of a matrix of random-access optoelectronic light emitters. This matrix can be used as a multi-cell emitter unit in an optoelectronic switching network in accordance with the second form of the embodiment described above.

The cells 121 are arranged in matrix form and each consists of a light emitting diode D2 whose cathode is grounded and whose anode is connected to an input channel 122 by means of a row control switch 104 and a row information bus 105 (common to all the cells in the same row) as well as by means of a switch T2 (field effect switching transistor) that is peculiar to each cell.

All the components or circuits which play the same rôle as in the multi-cell receiver drawing in FIG. 3 carry the same reference numerals. This covers not only the switches 104 and the row information buses 105 but also the instruction register 116, the address recognition circuit 107 (a multi-cell emitter unit address in this case), the cell selection register 108, the row switch control bus 109, the column switch control bus 110 and the cell address decoding circuits (gates) 111 and 112.

The mechanism for selecting the cells 121 as depicted in FIG. 7 is thus identical to that of cells 101 in FIG. 3, apart from the fact that in FIG. 7, the cell 121 selected is connected to the information channel 122 in order to emit a light flux whose modulation reproduces that of the transmitted signal.

Figure 9:
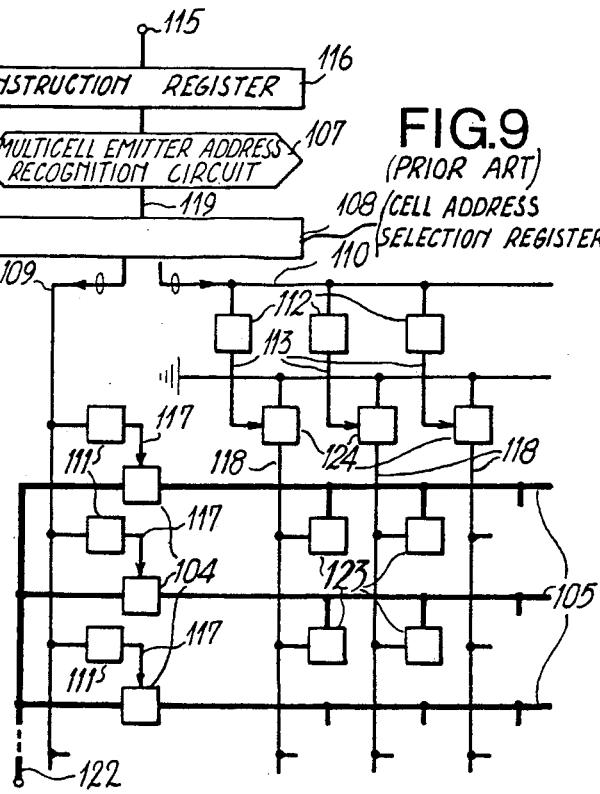
FIG. 9 is a block diagram of a second embodiment of such a selector unit in the form of an integrated component usable as an emitter.
Figure 10:
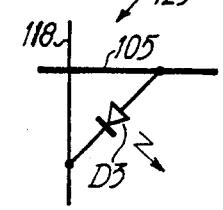
FIG. 10 is a diagram of an emitter cell of the integrated component.

The multi-cell emitter unit whose description has just been summarized may obviously be designed in the form of an integrated circuit. FIGS. 9 and 10 are illustrations of a variation which eases this design by avoiding the addition of a field effect transistor to each light emitting diode. The switches T2 (FIG. 8) are no longer required. The diodes D3 making up the cells 123 to have cathodes connected to the information buses 118 instead of ground. The column control buses 113 no longer enter the cell matrix where they are replaced by the column information buses 118 which are connected down to ground by means of column switches 124 (field effect transistors) that are governed by the gates 112. The design of this variation implies having some insulation between the light emitting diodes and the chip. An analogous structure can be used for designing multi-cell receiver units.

Symbolic representation

Figure 11:
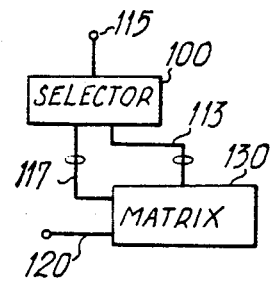
FIG. 11 is a diagram symbolizing a representational mode of the afore-mentioned selector units, emitters or receivers.

For easier interpretation of some of the drawings that will be considered hereafter, a form of representation similar to that illustrated in FIG. 11 will sometimes be adopted to represent the multi-cell emitter or receiver units. This indicates:

the selector circuit 100 which combines the instruction register 116, the address recognition circuit 107 (emitter or receiver addresses), the cell address selection register 108 of FIGS. 3, 7 and 9 and the row and column address buses 109 and 110 in the said Figures, the column and row control buses 113 and 117, the channel 120 which represents either the information output channel 114 in FIG. 3 (case of a multi-cell receiver unit) or the information input channel 122 in FIGS. 7 and 9 (case of a multi-cell emitter unit).

lastly, the matrix 130 which represents all the other components.

Generally speaking, for the sake of simplicity, it will be assumed that the elementary switching circuits are made up of field effect transistors. In practice, these can of course be replaced by any other crosspoint compatible with the bit-rate of the information signals to be transmitted and with the technology that is in use.

Terminology

To simplify the description of the multi-channel multi-cell receiver unit and emitter unit embodiments given as examples in accordance with the invention, the following terminology should be adopted:

row or column information bus: link for transmitting information signals between all the cells in a row or all the cells in a column and an information output (case of receivers) or information input (case of emitters) channel;

row or column control bus: link transmitting the control signals to all the cells in a row or all the cells in a column as delivered by a selector circuit and intended for controlling the connection of the said cells to an information bus.

An information (or control) bus is given to the name of information (or control) link when it serves only an individual cell.

Given hereinafter are examples of various embodiments of multi-channel multi-cell receiver units and switching networks in accordance with the invention making use of these receiver units, multi-channel multi-cell emitter units and switching networks in accordance with the invention making use of these emitter units. Each of these examples carrries a sub-title referring to what it deals with.

Along with these lines:

Example R1, Example R2, etc . . . indicate a first example, a second example, etc . . . of a multi-channel multi-cell receiver unit in accordance with the invention Example E1, Example E2, etc . . . indicate a first example, a second example, etc . . . of a multi-channel multi-cell emitter unit in accordance with the invention Example C1, Example C2, etc . . . indicate a first example, a second example, etc . . . of a switching network in accordance with the invention.

EXAMPLE R1

Figure 12:
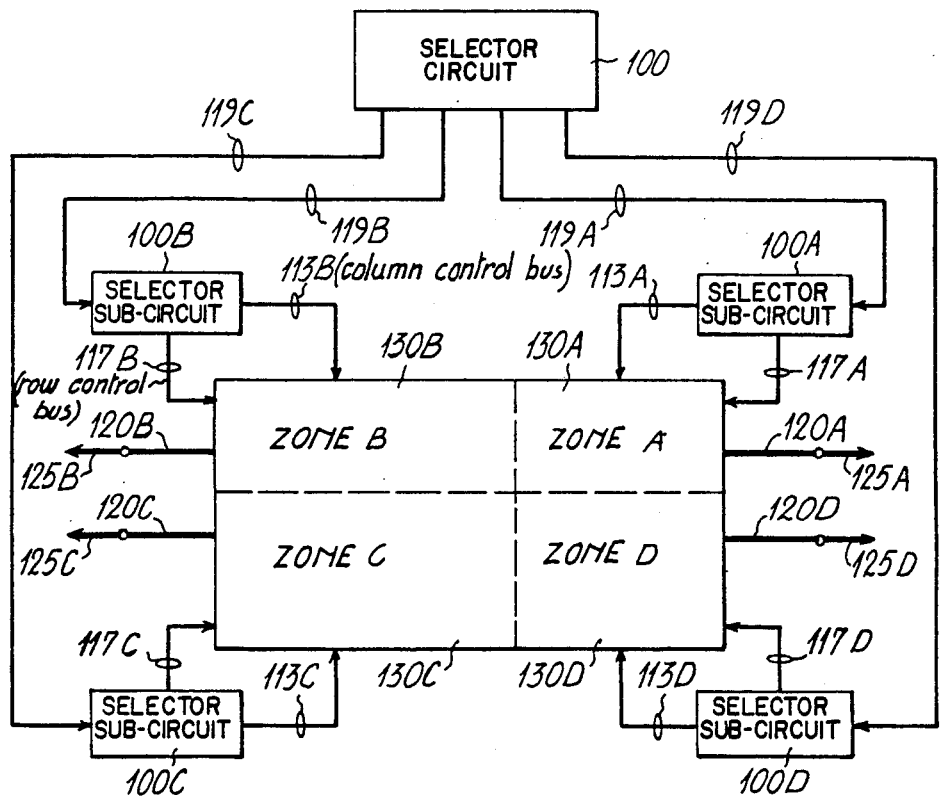
FIG. 12 is a diagram showing the overall lay-out of a multi-channel multi-cell receiver unit in accordance with the invention (example R1)
Figure 13:
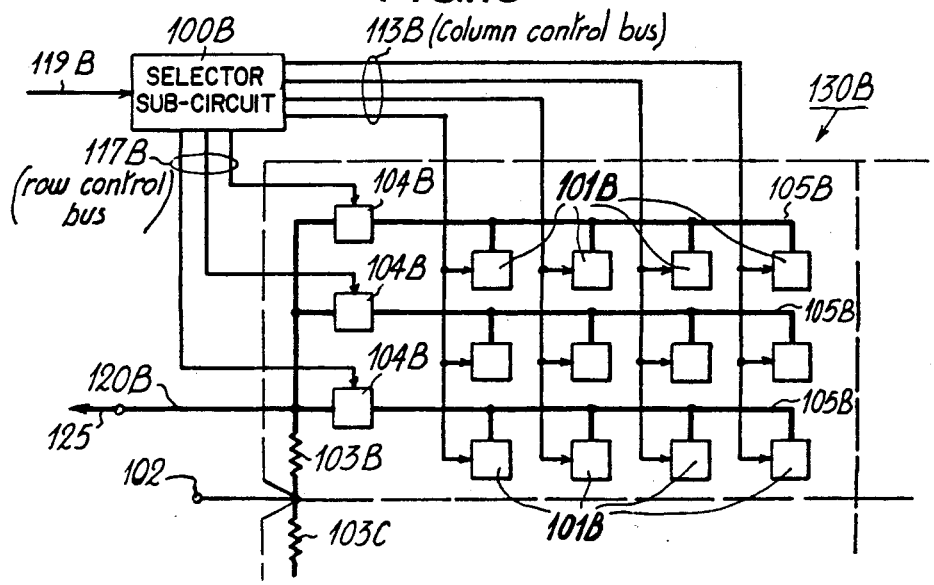
FIG. 13 is a partial block diagram of the receiver unit of FIG. 12

Reference is now made to FIGS. 12 and 13, block diagrams of a multi-channel, multi-cell switching network and a multi-channel multi-cell receiver unit. This multi-channel multi-cell receiver unit comprises four zones of elementary receiver cells and four output channels. The multi-cell matrix is split into four zones 130A, 130B, 130C and 130D. These four zones can be either equal or unequal, i.e. comprise equal or unequal numbers of cells. The lines separating the four zones can be non-rectilinear or rectilinear. In the latter case, the zones are sub-matrices.

The circuit selector 100 here comprises the instruction register and the multi-cell receiver address recognition circuit (see 116, 107 in FIG. 3).

Each zone comprises, besides the cells, a selector sub-circuit 100A–100D controlled by the selector circuit 100, row and column control buses, a row information bus and an information output channel. Each of these zonal elements carries the same reference numeral as the homologous elements in the other zones but this reference numeral is accompanied by a letter characterizing the zone. As a result of this, the zone 130B (FIG. 13) which includes the elementary receiver cells 101B, the row control bus 117B and column control bus 113B, the row information bus 105B and the row information bus switches 104B, delivers the selected cell 101B signal via the information bus 120B and output channel 125B. The supply terminal 102 reverse biases the cell 101B across the resistor 103B. The selector sub-circuit 100B sends the cell address on the buses 113B and 117B as sent it by the selector circuit 100 and the bus 119B.

EXAMPLE C1

FIG. 14 is a block diagram of a concentrator, which in a multi-service network, provides connections and disconnections between subscriber stations and a local exchange. It comprises two switching networks in accordance with the invention. The multi-channel multi-cell receiver units used in this concentrator comply with example R1 (FIGS. 12 and 13).

The switching system ascribed to the "deconcentration" direction (i.e. from the local exchange to the subscriber stations), comprises the trunk conjugate emitter board TCEC and the subscriber selector receiver board TSRA. The switching system ascribed to the "concentration" direction comprises the subscriber conjugate emitter board TCEA and the trunk selector receiver board TSRC. The central control circuit CC delivers its orders to the selector circuits and sub-circuit RA and RC via the links LCA and LCC.

The concentrator is part of multi-service networks for switching animated pictures, audio signals and data. The majority of the traffic (cable television, video-library) is therefore ascribed to undirectional communications in the "deconcentration" direction. These communications are referred to as diffusion communications. Each subscriber output equipment, in the deconcentration direction (TSRA board), carries a multi-channel multi-cell receiver unit RA (subscriber links LRA) fitted with an optical projection member MOA and, in the concentration direction (TCEA board) each subscriber input equipment carries two emitter units EA1 and EA2 (two links LEA). There are hence twice as many subscriber emitter units EA on the board TCEA as subscriber multi-channel, multi-cell receiver units RA on the board TSRA. Assuming that the number of multi-channel multi-cell receiver unit of board TSRC has four channels, the number of simultaneous diffusion communication is $2 \times 4 = 8$.

The selector circuits and sub-circuits (address recognition, cell selection) of the receiver units RA and RC are incorporated in these multi-channel, multi-cell receiver units and are not shown. The transmission channels between the concentrator, on the one hand, and the local exchange and subscribers, on the other hand, are multiplexed.

Trunk input eqipment items such as DC each make it possible to connect a trunk incoming multiplex link MEC to twelve emitter units EC, a link MEC thus conveying twelve information channels. Subscriber output equipment items such as MA each make it possible to connect the four zones of a receiver RA to a subscriber outgoing multiplex link MRA, each subscriber then being able to receive four channels simultaneously. Subscriber input equipment items such as DA each make it possible to connect a subscriber incoming multiplex link MEA to the two emitters $EA_1$ and $EA_2$. Lastly, trunk outgoing equipment items such as MC each make it possible to connect the four zones of three receiver units RC to a trunk outgoing multiplex link MRC which thus conveys twelve information channels.

The equipments DC and DA comprise detection, amplification and demultiplexing means. The equipments MA and MC comprise amplification, multiplexing and light injection means. The way these equipment items are made up depends indeed, as already intimated, on the nature of the multiplex links MEC, MRA, MEA and MRC. Only the multiplexing and demultiplexing means will be discussed here since the amplification, detection and light injection means structures are quite clear. It is assumed here that the lines consist of optical fibers, that the signals conveyed by the subscriber links MRA and MEA are frequency or time multiplexed (light signal modulation by multiplex) and that the signals conveyed by the trunk links MRC and MEC are not only frequency or time multiplexed but also wave length multiplexed. Frequency or time multiplexing and demultiplexing involve known electronic units. Wavelength multiplexing and demultiplexing involve known optical units.

As each link MEC conveys a multiplex of twelve channels, these are frequency or time multiplexed in groups of four channels and the three groups are wavelength multiplexed. Trunk equipment DC then includes (FIG. 15) a triple-output optical demultiplexer DOP1, photodetectors PD1 and three quadri-output electronic demultiplexers DE1. Each of the twelve demultiplexer DE1 outputs is connected via a link LEC to one of the emitters EC on the board TCEC.

As each link MRA conveys a four-channel frequency or time multiplex, subscriber equipment MA comprises (FIG. 17) an electronic multiplexer ME1 having four inputs respectively connected to the four zonal output links LRA from one of the multi-channel multi-cell receiver units RA and a light injector DL1 (light emitting diode or laser diode) coupled to the tip of the optical fiber which constitute the corresponding link MRA.

As each link MEA conveys a two-channel multiplex, subscriber equipment DA (FIG. 16) comprises therefore a photodetector PD2 (photodiode) illuminated by the optical fiber which constitutes the link MEA and an electronic demultiplexer DE2 whose two outputs are respectively connected to two emitters $EA_1$ and $EA_2$ (board TCEA) via links LEA.

Finally, as each link MRC conveys a twelve-channel multiplex, trunk equipment MC (FIG. 18) comprises as a result, on the one hand, three electronic multiplexers ME2 each having four inputs respectively connected to a zonal output link LRC from a multi-channel multi-cell receiver unit RD (board TSRC) and, on the other hand, three 26 light injectors DL2 giving different wave-lengths respectively fed by these three multiplexers and coupled to the optical fiber MRC by means of an optical multiplexer MOP2.

Still by way of example, an indication is given below of the number of channels that the optical wave-guides can convey, divided into the various services (followed by the degree of occupation of these channels in erlangs) and the breakdown of the emitter and receiver boards for a concentrator serving 1024 subscribers:

incoming trunk links: 35 optical fibers MEC conveying 420 channels, namely 50 TV channels (50 erlangs), 200 video-library channels (180 erlangs) and 170 visiophone channels (150 erlangs)

trunk emitter board TCEC: 420 emitter units;

subscriber receiver board TSRA: 1024 quadri-channel multi-cell receiver units (for 1024 subscribers) with 420 cells respectively coupled optically with the emitter units on the board TCEC;

subscriber outgoing links: 1024 optical fibers MRA each conveying four channels;

subscriber incoming links: 1024 optical fibers MEA each conveying two channels (the outgoing and incoming channels for the same subscriber may share the same optical fiber);

subscriber emitter board TCEA: 2048 emitter units (2 per subscriber and per fiber MEA);

trunk receiver board TSRC: 64 quadri-channel multi-cell receiver units with 2048 cells;

outgoing trunk links: 22 optical fibers MRC carrying 11 or 12 channels.

Each receiver RC on the board TSRC does not necessarily need access to all the 2048 emitters on the board TCEA. A certain advantage may be drawn from this freedom of scope to build up the receiver boards TSRA and TSRC using identical multi-channel multi-cell receiver units by making provisions for a higher number of receiver units on the board TSRC than required in practice.

The board TSRC together with the board TCEA can, for instance, be expanded into 5 "sub-boards". Each of the TSRC sub-boards, with the 13 receivers RC of 420 cells, serves the 410 emitters of one over-sized TCEA sub-board alloting each of them 512 cells, 92 of which are unused. The board TSRC, together with the board TCEA, is therefore expanded into 4 sub-boards and each of the TSRC sub-boards, with 16 receivers of 512 cells, serves the 512 emitters of one of the TCEA sub-boards. The TCEA and TSRC sub-boards are thus associated two by two.

The subscriber stations, not shown, comprise the necessary multiplexing and demultiplexing means together with the end optoelectronic equipment on optical fibres MRA and MEA.

Figure 19:
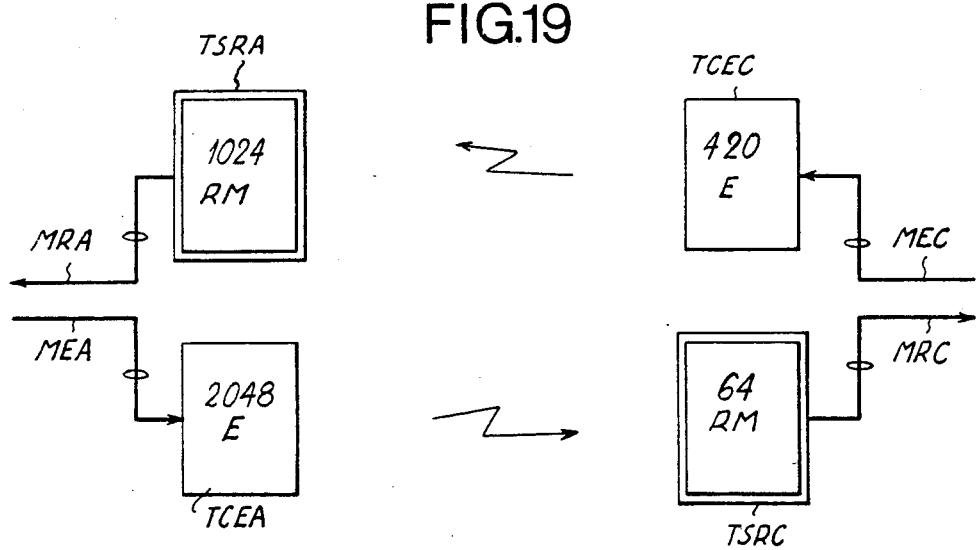
FIG. 19 is a symbolic diagram of the switching network of FIG. 14.

FIG. 19 symbolizes the concentrator shown on FIG. 14 in which a particular mode of representation has been used and will be carried through to the description of the following optoelectronic switching networks examples. The selector boards TSRA and TSRC, in this case it is also possible to over-size the receiver units of the board TSRA by receiver boards, are shown as rectangles with a double outline whereas the conjugated boards TCEA and TCEC, in this case emitter boards, are shown as single-outline rectangles. The symbols E and RM signify "emitter" and "multi-channel multi-cell receiver" respectively. The figures written above these symbols indicate the number of emitters or receivers. The arrows between the boards indicate the optical links between the receiver boards and the emitter boards that illuminate them. The multiplexed electrical links are represented as straightforward liaisons. The multiplexers and demultiplexers are not shown.

EXAMPLE C2: LOCAL EXCHANGE

Figure 20:
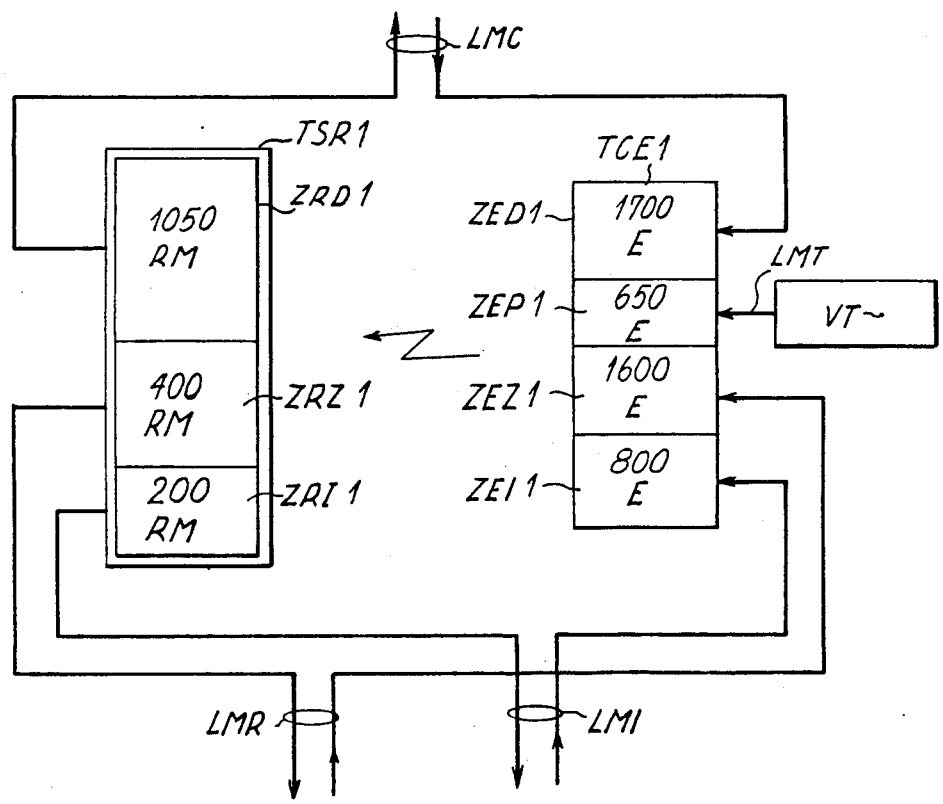
FIG. 20 is a symbolic diagram of a switching system (local exchange) with a receiver-selector board in accordance with the invention (example C2)

The local exchange in FIG. 20 comprises a single switching network that comprises a conjugated emitter board TCE1 with 4750 emitters and a receiver selector board TSR1 with 1650 multi-channel multi-cell receivers (4 output channels). This emitter board and this receiver board respectively comprise:

a sub-board ZED1 (1700 emitters) and a sub-board ZRD1 (1050 receivers) connected to 10 concentrators serving a subscriber unit via multiplex links LMC;

a sub-board ZEZ1 (1600 emitters) and a sub-board ZRZ1 (400 receivers) connected with 4 other local exchangers via links LMR;

a sub-board ZEI1 (800 emitters) and a sub-board ZRI1 (200 receivers) connected with the interurban networks via links LMI.

The emitter board TCE1 further comprises a sub-board ZEP1 (650 emitters) connected to private service stations VT (video-library) via links LMT.

The other 4 local exchanges are made up in the same fashion as that above. Each local exchange is connected to 10 concentrators and to a service station analogous to the station VT. These 5 exchanges form a local zone in the general switching network within which any subscriber unit can receive programs from all of the services stations in the local zone via the concentrator to which the subscriber unit is attached and the local exchange serving this concentrator.

From the foregoing, the use of quadri-channel multi-cell receivers requires the use of only 1650 receivers in the receiver selector board TSR1 whereas 6600 monochannel receivers would be required. The size of the board could be reduced still further (and hence that of the local exchange in question) by utilizing fewer multi-cell receivers having more output channels. Other means in accordance with the invention however exist for reducing the board size; in particular certain optical links between the emitter and receiver boards can go unused. Such is the case for instance in the local exchange shown in FIG. 20. Indeed, while all the emitters on the emitter board TCE1 illuminate all the receivers on the receiver board TSR1, the emitters on the sub-boards ZEZ1 and ZEI1, ascribed to channels coming from other local exchanges and the interurban network, have to illuminate in reality only the receivers on the sub-board ZRD1 serving the concentrators linked to the local exchange in question. There is hence little use in the emitters illuminating the receivers of the sub-boards ZRZ1 and ZRI1. Likewise, of the traffic moved by the emitters of the emitter sub-board ZED1 (e.g. 1500 erlangs), only a fraction (e.g. 150 erlangs) is intended for establishing strictly local communication (i.e. between subscribers attached to the same exchange), by means of the receivers of the receiver sub-board ZRD1. The remaining fractions are intended, on the one hand (600 erlangs), for the other local exchanges, in the zone (receiver sub-board 2RZ1) and, on the other hand (700 erlangs), for the interurban network (receiver sub-board ZRI1).

The reduction in the number of receivers to be illuminated by each of the emitters affords numerous advantages, as has already been observed, particularly as regards the gain in luminous power captured by each receiver. Furthermore, it is quite clear that for an equal angle spread (solid angle to be covered by an optoelectronic emitter), the length of the optoelectronic switching network device varies with the reciprocal of the square root of the surface area to be illuminated. There is, therefore, every interest, wherever possible, in dividing the switching network into several sub-networks, in terms of the links to be established without necessarily multiplying the stages. This is what will be demonstrated in the ensuing examples.

EXAMPLE C3

The local exchange in this example (FIG. 21) fulfills the same function as that in example C2 (FIG. 20), i.e. the traffic with the interurban network (links LMI), 4 other local exchanges (links LMR) and 10 other concentrators (links LMC). It differs in that the separation of the local communications at the concentrator level and the separation of the video-library problems in terms of their destination at the service level make it possible to blow up the emitter and receiver boards.

The emitter board TCE2 replaces the board TCE1, but serves only the 925 multi-channel multi-cell receivers of the receiver selector board TSR2 which is substituted for the sub-board ZRD1 and which itself now serves only 10 concentrators via links LMC.

The traffic between the cable television station VD and the concentrators runs via the special-purpose emitter board TCE3 and the special-purpose receiver board TSR3 which is itself also connected to the links LMC in the outbound direction.

Lastly, the traffic between the concentrators and the services station VT on the one hand, and the other local exchanges in the local zone and the interurban network on the other hand, runs via the special-purpose emitter board TCE4 and the special purpose receiver selector board TSR4.

By adding up the emitters and receivers (the numbers thereof are shown in the Figures), it can be seen that the emitter board in FIG. 21 taken together comprise 5030 emitters (against 4750 in the emitter board of FIG. 20) and the receiver boards taken together comprise 1650 multi-channel multi-cell receivers.

The local exchange in FIG. 22 satisfies practically the same functions as that in FIG. 21. It differs therefrom in that the separation of the local communications and the separation of the video-library programs are carried within the local exchange itself. The emitter board TCE6, connected to the receiver board TSR8 (see below), the other local exchanges via links LMR and the interurban network via link LMI comprises 2800 emitters. It serves the receiver selector board TSR6 which is connected to the concentration via the links LMC and the emitter board TCE8 (see below) and comprises 950 quadri-channel multi-cell receivers. The emitter board TCE7, connected to the cable television station VD, serves the receiver board TSR7 connected to the concentrators (links LMC). As in the previous example, these two boards respectively comprise 50 emitters and 125 quadri-channel multi-cell receivers. Finally, the emitter TCE8 connected to the concentrators (links LMC), video-library service station VT and receiver board RSR6, comprises 2400 emitters. It serves the receiver selector board TSR8 which is connected to the other local exchanges (links LMR), the interurban network (links LMI) and the emitter board TCE6 and which comprises 700 quadri-channel multi-cell receivers.

It will be observed that the switching network thus formed behaves like a two-stage network for the local communications, since these run through the boards TCE8, TSR8, TCE6 and TSR6 successively. Similarly, the local video-library program broadcasts (station VT) travel through the connection network twice since they run through the boards TCE8, TSR8, TCE6 and TSR6.

Lastly, any transit traffic can be routed through the boards TCE6, TSR6, TCE8 and TSR8. If the operational parameters of the switching system device and in particular the occupation rates have been suitably chosen, this traffic is zero under normal functioning but can become useful for relieving the network in the event of an accidental break in a link between local exchanges or the local exchange in question and the interurban network.

Multi-channel multi-cell receivers—other forms of embodiments

In the examples of switching system devices with receiver selector boards, that have just been described (see particularly FIGS. 12, 13 and 14), it will be noted that one emitter zone and only one in the conjugated emitter board corresponds to each zone of cells in the matrix of a receiver. A given output channel of a receiver cannot be optically linked to just any emitter board input. A receiver cannot gain simultaneously access to two inputs belonging to the same zone on the emitter board. A restriction on the access of each of these channels to the emitter board input channels is therefore added to the limitation due to the number of output channels from a receiver. In short, a quadri-channel receiver does not make it possible to establish any four link connections and blockages may arise in certain cases. It will be said that these receivers and their cells have restrictive access. Additionally, in each zone, the number of buses is necessarily equal to the sum of the number of lines and columns. Lastly, it is not possible to switch the signal normally intended for one output channel to another output channel.

An examination now follows of some examples of multi-channel multi-cell receiver embodiments in accordance with the invention which afford greater operational flexibility and ease than the receivers depicted in FIGS. 12 and 13 for one or more of the following reasons:

presence of cells with no restriction on access (so-called "individual" access cells)

reduction in the number of buses required possibility of switching the outputs from different zones to any output channel.

All these multi-cell receivers can be designed in integrated circuit form, as can the receiver given in example R1.

EXAMPLE R2

Figure 23:
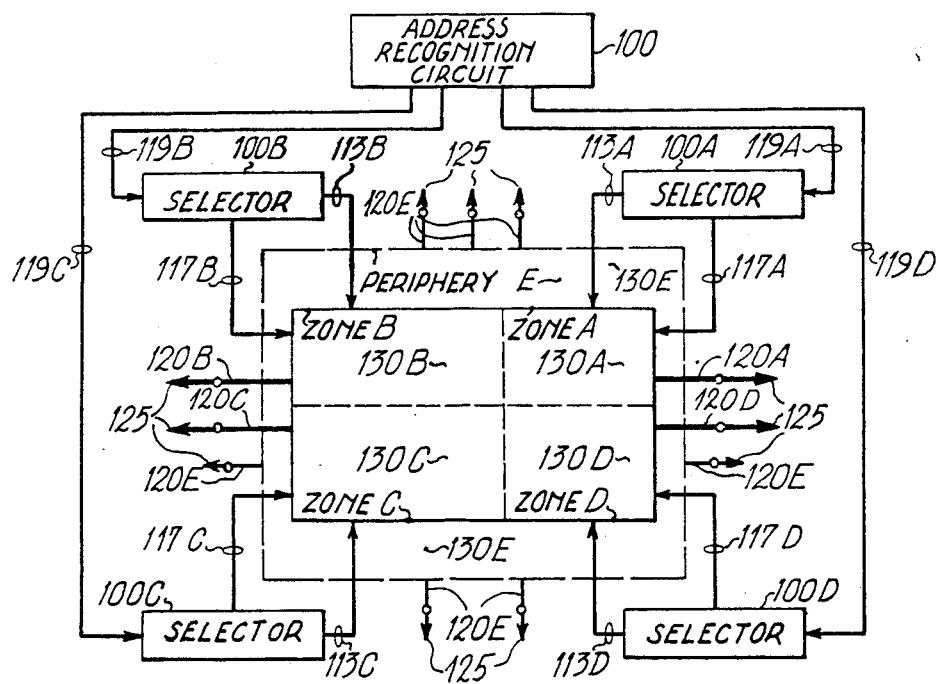
FIG. 23 is a diagram of the overall lay-out of a second multi-channel multi-cell receiver unit in accordance with the invention (example R2)
Figure 24:
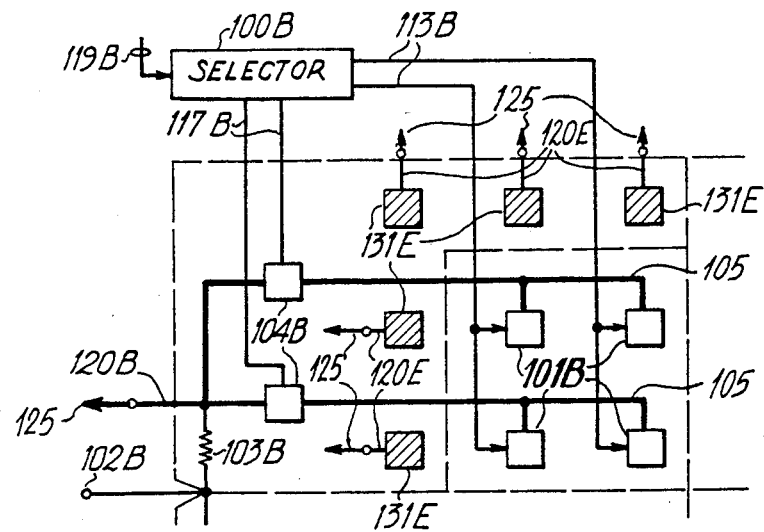
FIG. 24 is a partial block diagram of the receiver of FIG. 23.

The receiver schematized in FIGS. 23 and 24 is obtained by excluding the peripheral cells 131E from the four zones 130A, 130B, 130C, 130D of the receiver in example R1, where these cells are shaded in FIG. 24 to distinguish them from the others and each have an information link 120E connected to an output channel 125 in which their output signal is permanently awailable. As will be said that these have "individual access". Indeed, an individual-access cell by itself forms a single-cell zone. The individual cells taken together are referred to on FIG. 23 by the term "periphery" and carry the reference 130E.

EXAMPLE R3

Figure 25:
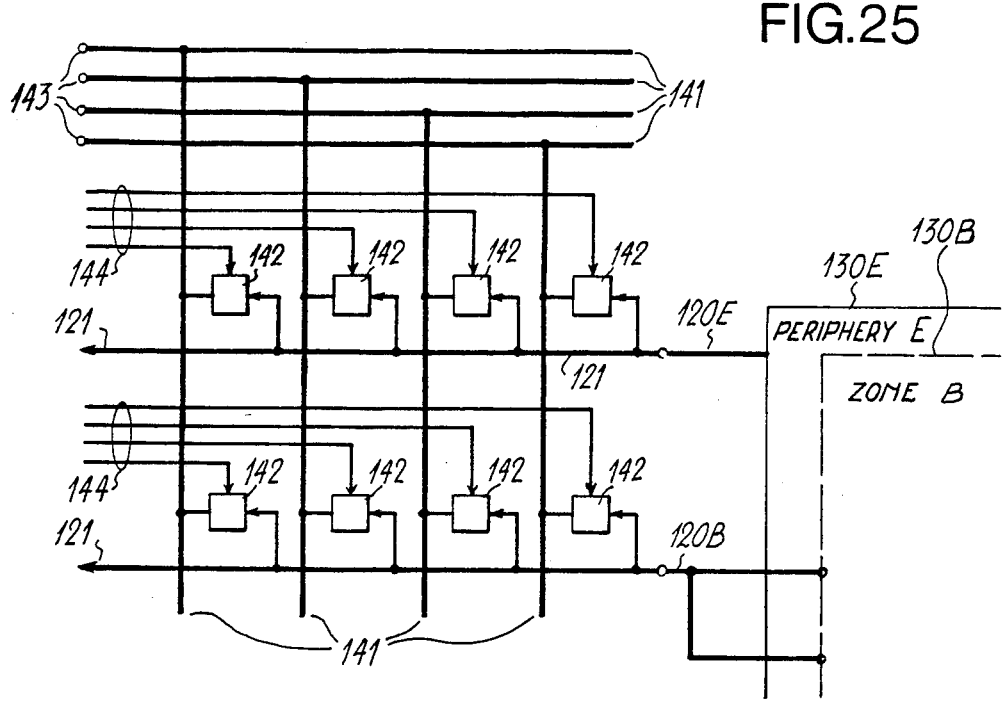
FIG. 25 is a partial block diagram of a variation of the receiver of FIG. 23 (example R3)

FIG. 25 depicts a partial schematization of a multi-channel multi-cell receiver which illustrates the possibility of reducing the number of output channels in a receiver similar to that in example R2 and of switching any individual-access cell or any restrictive-access cell zone to any output channel.

The entire cell matrix (only the zones 130B and 130E are shown) is embraced by four information output channels 141. Each of these channels is connected to an output terminal 143. The connection of each channel to a zone information bus, for example 120B, or to a cell information link, for example 120E, is made by a switch 142, governed by a control link 144 connected to one of the selection circuits (not shown) and via an information bus 121. The switches 142, buses 121, and channels 141 thus form switching matrices.

EXAMPLE R4

Figure 26:
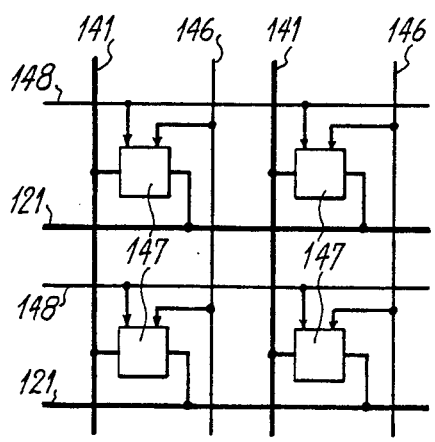
FIG. 26 is a partial block diagram of a further embodiment of the receiver of FIG. 23 (example (R4), FIG. 27 is a diagram of a receiver cell in the embodiment of FIG. 26, FIG. 28 is a partial block diagram of a further embodiment of the receiver of FIG. 23 (example R5), FIG. 29 is a synoptic drawing illustration of a variation of the aforesaid switching systems (example C5), FIG. 30 is a block diagram of a third multi-channel multi-cell receiver in accordance with the invention (example R6), FIG. 31 is a diagram of a switch in the receiver of FIG. 30, FIG. 32 is a diagram of a receiver cell of the receiver of FIG. 30, FIG. 33 is a block diagram of a multi-channel multi-cell receiver in accordance with the invention, FIG. 34 is a diagram of receiver cells in the receiver of FIG. 33, FIG. 35 is a variation of the receiver cells of FIG. 34, FIG. 36 is a block diagram of a fourth multi-channel multi-cell receiver in accordance with the invention (example R8), FIG. 37 is a diagram of a receiver cell in the receiver of FIG. 36, FIG. 38 is a diagram of a switch in the receiver of FIG. 36, FIG. 39 is a block diagram of a second multi-channel multi-cell receiver in accordance with the invention (example R9), FIG. 40 is a diagram of a receiver cell in the receiver of FIG. 39, FIG. 41 is a diagram of a fifth multi-channel multi-cell receiver in accordance with the invention (example R10), FIG. 42 is a block diagram of a sixth multi-channel multi-cell receiver in accordance with the invention (example R11), FIG. 43 is a schematic drawing of the connections between receiver cells of the receiver of FIG. 42, FIG. 44 is a diagram of a receiver cell of the receiver in a first embodiment, FIG. 45 is a diagram of a receiver cell of the receiver in a second embodiment, FIG. 46 is a partial block diagram of a seventh multi-channel multi-cell receiver in accordance with the invention (example R12), FIG. 47 is a partial block diagram of an eighth multi-channel multi-cell receiver in accordance with the invention (example R13), FIG. 48 is a diagram of the overall lay-out of a multi-channel multi-cell emitter in accordance with the invention, FIG. 49 is a block diagram of a first embodiment of the emitter of FIG. 48 (example E1), FIG. 50 is a diagram of an emitter cell in the embodiment of FIG. 49, FIG. 51 is a block diagram of a second embodiment of the emitter of FIG. 48 (example E2), FIG. 52 is a diagram of an emitter cell in the embodiment of FIG. 51, FIG. 53 is a synoptic drawing of a switching system (concentrator) having emitter-selector boards in accordance with the invention (example C6), FIG. 54 is symbolic drawing of the concentrator of FIG. 53.

In example R3, the total number of switching network switches 142 is necessary equal, as is the total number of their control link 144, to the product of the number of buses of information links to be switched times the number of output channels. The provisions as partially schematized in FIG. 26 and the switch diagram in FIG. 27 make it possible in many cases to reduce the number of control buses. Each output channel 141 is flanked by a first control bus 146 connected to all the access switches of the said channel. A control bus 148 is ascribed to all the switches serving the same zone (each peripheral cell forming a zone). These switches which carry the reference numeral 147 (instead of 142 in FIG. 25) comprise:

an AND gate P2 whose two inputs are respectively connected to a control bus 146 and a control bus 148, a bistable flip-flop B2 whose input is connected to the output from the gate P2, and a switching field effect transistor T2 whose control electrode is connected to the output of the flip-flop B2 and which connects the row information bus 121 to the information output channel 141 when it is unblocked.

To control the switches, it is sufficient therefore to have a total number of control buses equal to the sum of the number of output channels and the number of zones. The presence of the bistable B2 in each switch makes it possible to control said switch by simultaneously sending control pulses along the buses 146 and 148 to which it is connected.

EXAMPLE R5

Figure 28:
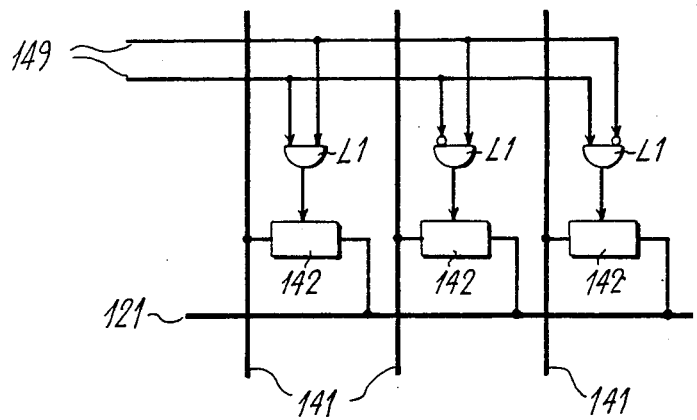

Another solution (FIG. 28) permitting a reduction in the number of control buses consists of reverting to the bus and switch diagram in FIG. 25, but of controlling the switches 142 by logic decoding circuits L1, composed for instance of AND gates. These carry enough direct or inverting inputs to recognize the address ascribed in a column to a given switch 142 and the switch control bus 149 of course comprises the number of conductors whose logic state expresses the said address. As a result, by having a number n of switch control conductors 149, a zone information bus 121 (a zone comprising at least one cell) can be switched at will to any of a plurality of $2^{n-1}$ output channels 141.

It goes without saying that the connection possibilities between inupt and output channels, i.e. between the cells of a selector unit and its information channels, increase with higher numbers of zone outputs. Should one peripheral row of individual access cells not suffice, then in theory a second row at least can be added, around the first. The need, however, then arises either of introducing at least a second information bus (analogous to the buses 105 in FIG. 24) in the inter-cell intervals or of laying a transparent conductor over the first row of peripheral cells, or of implementing certain outputs by means of spacial connections. One way or another, the design of multi-channel receivers becomes then more complicated and more expensive.

The configuration in FIGS. 25 to 28 that have already been studied afford the possibility, by means of switching matrices formed of the switches 142 or 147, of switching any individual access cell or any restrictive access cell zone to any one of channel output bus conductors and consequently of eliminating any risks of blockage as regards switching the output channels to the peripheral emitters of the conjugated board.

The risks of blockage may also be eliminated, or at least between certain privileged inputs (cable television, etc . . . ) of the emitter board and the receiver output channels, without using individual access cells or switching matrix. Two or more emitters merely have to be ascribed to each of these privileged inputs, where each emitter ascribed to the same input has its image in a separate zone of the receivers.

EXAMPLE C5

When the risk of blockage of the output channels from the selector board receivers is low (in a concentrator, for instance, when there is little chance of a subscriber simultaneously requesting two programs broadcast by two emitters in the same zone), another solution consists of utilizing certain emitters on the conjugated board for rerouting certain programs (channels) to other receiving cells in the selector board receivers than those cells for which they are normally intended.

Figure 29:
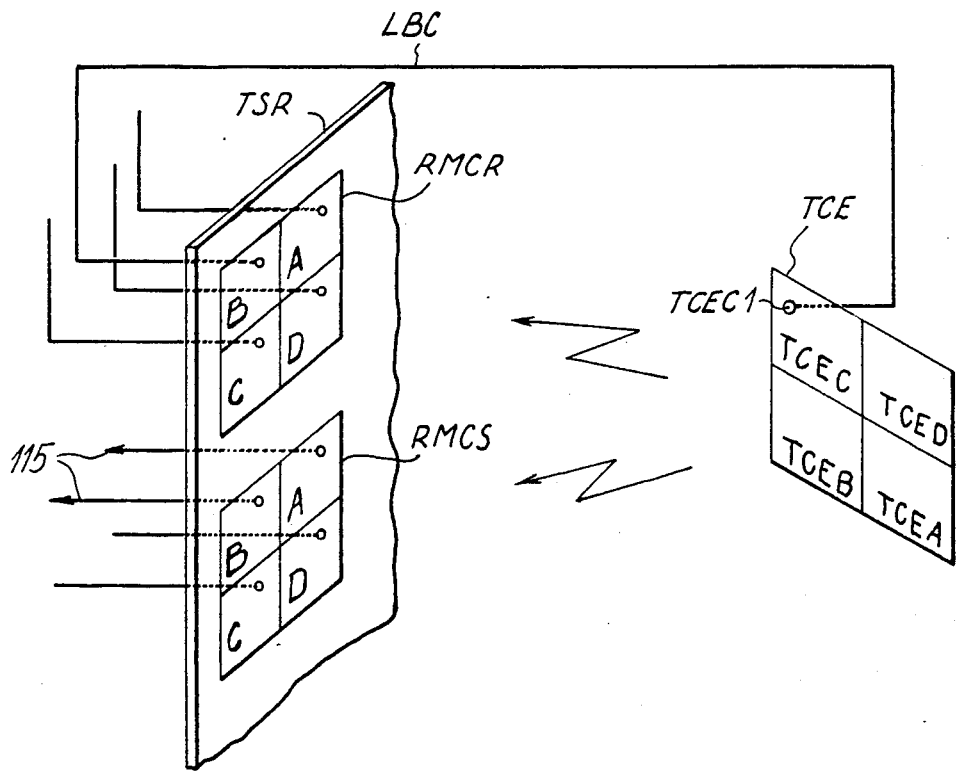

FIG. 29 depicts a switching system in accordance with the invention configured for this purpose. An emitter board TCE and a portion of the receiver selector board TSR are shown. Neither the optical arrangement associated with the receivers nor the selection and multiplexing means thereof have been shown. Each quadri-channel multi-cell receiver RMC comprises four cell zones A, B, C and D that are optically conjugated with the emitter zones TCEA, TCEB, TCEC and TCED of the conjugated board TCE respectively. The drawing depicts two receivers one of which, RMCS, is used normally since it delivers its signals via the output links 115, whereas the other, RMCR, is used for the return. Its zone B is connected, for example, by a link LBC to the emitter TCEC1 of the zone TCEC. Hence, for instance, one of the programs transmitted by the zone TCEB emitters is broadcast normally by the zones B of the receivers such as RMCS but it is also recovered if need be by the zones B of the return receivers such as RMCR, then retransmitted by the emitters such as TCEC1 connected through a link LBC with the said zones and then lastly delivered by the zone C cells of the receivers RMCS which are optically conjugated with these emitters TCE1. The selection means of these receivers RMCS can be controlled for switching the returns upon election or systematically (a certain times for example).

The links RMCR-LBC-TCEC1 can further be used on stand-by for returning the signals emitted by one emitter to another, under the assumption of there being a partial failure affecting certain cells of a selector receiver (or emitter) and forbidding any direct link between certain emitters and certain selectors.

EXAMPLE R6

Figure 30:
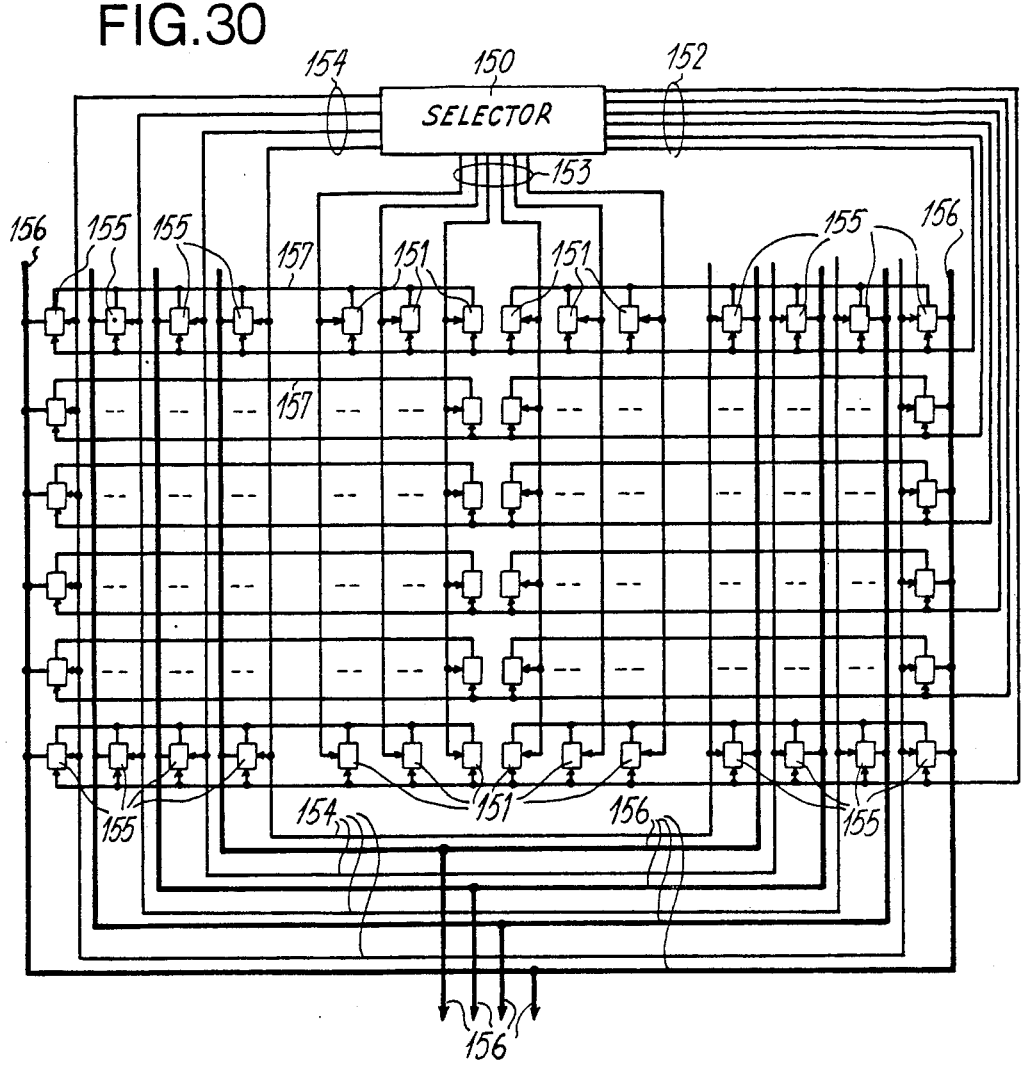
Figure 31:
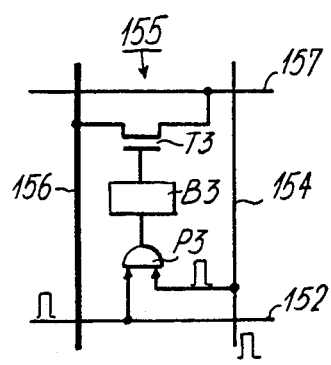
Figure 32:
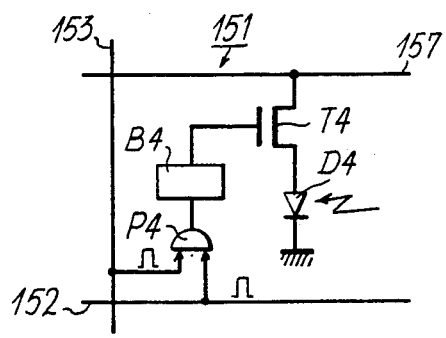

FIGS. 30, 31 and 32 relate to an embodiment of multi-channel receivers in accordance with the invention, referred to as having "half-line access" in which any cell of any half-line can be switched to any output channel, but in which two cells of the same half-line cannot be used simultaneously. It should be pointed out that the two half-lines which form a line can comprise different numbers of cells. The selection circuit 150 delivers selection orders by means of three series of buses, namely:

the row control buses 152 each of which can deliver a row selection pulse to all the receiver cells 151 in the same row and to output channel selection switches 155 also arranged in rows (to the extent of one switch per output channel) on either side of each line of cells and which thus form as many columns of switches as channel output buses, the column control buses 153 each of which can deliver a column selection pulse to all the receiver cells 151 in the same column of cells, and the channel selection buses 154 each of which can deliver a channel selection to all the switches 155 in the same column of switches.

Each switch 115 comprises:

an AND gate P3 whose two inputs are respectively connected to the line control bus 152 and the channel selection bus 154, a bistable flip-flop B3 whose input is connected to the output from this gate P3, and a switching transistor T3 whose control electrode is connected to the bistable B3 output and whose two other electrodes are respectively connected, on the one hand, to a half-line information bus 157 which links the cells 151 to the switches 155 and, on the other hand, to the output channel 156 which links all the switches in the same column.

Each receiver cell 151 comprises:

an AND gate P4 whose two inputs are respectively connected to the column control bus 153 and to the row control bus 152, a flip-flop B4 whose input is connected to the output from this gate P4, and a switching transistor T4 whose control electrode is connected to the flip-flop B4 output and whose other two electrodes are respectively connected, on the one hand, to the half line information bus 157 and, on the other hand, to the anode of a photodiode D4 whose cathode is earthed.

As a result, pulses simultaneously sent by the selection circuit 150 along given buses 152, 153 and 154 control, via flip-flops B3 and B4, the connection of a given photodiode 154 to a given information bus 157 and the connection thereof to a given output channel 156. Like in example R4, the peripheral cells can include individual access means.

EXAMPLE R7

Figure 33:
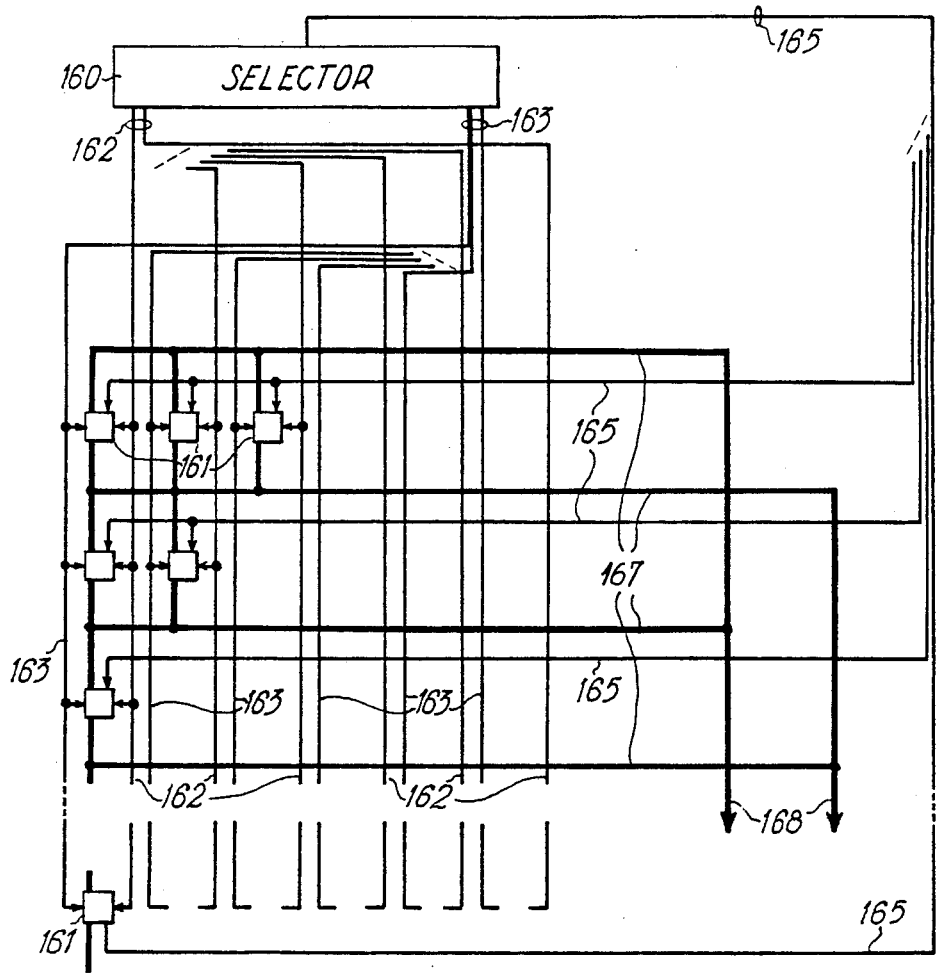
Figure 34:
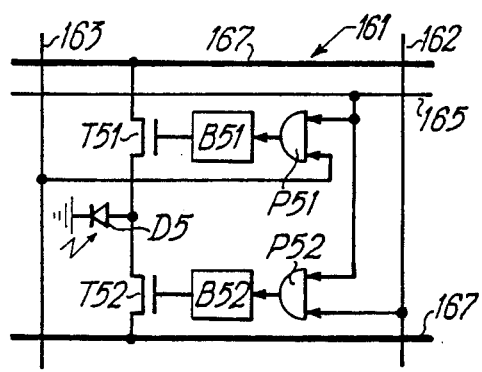

FIGS. 33 and 34 illustrate an example embodiment of a two-channel receivers with no blockage in accordance with the invention in whic each cell have access to two information buses 167 whereas two column control buses 162 and 163 and one row control bus 165 make it possible to select the desired cell and the information bus linking it to the output channel.

In this particular cas (2-channel receivers), the switching matrix then becomes of no use. The information buses 167 merely have to be alternately connected to the two information output channels 168.

The selection circuit 160 delivers its control pulses along three series of buses, namely:

a first series of cell column buses 162 each of which serves all the cells 161 in the same column, a second series of cell column control buses 163 each of which also serves all the cells 161 in the same column, and line control buses 165 each of which serves those cells 161 in the same row.

Each receiver cell 161 comprises:

and AND gate P51 whose two inputs are respectively connected to the bus 165 which serves the column of corresponding cells, a bistable flip-flop B51 whose input is connected to the output from the gate P51, and AND gate P52 whose two inputs are respectively connected to the said bus 165 and the bus 162 which serves the said column of cells, a photodiode D5 whose cathode is run to ground, and two switching transistors T51 and T52 whose control electrodes are respectively connected to the flip-flops B51 and B52 outputs and whoch series-link the two information buses 167 serving the said row of cells.

By way of two-channel multi-cell receiver such as this, with no risk of blockage, access may be gained to any two cells and these may be respectively connected to one and the other of the two output channels.

Figure 35:
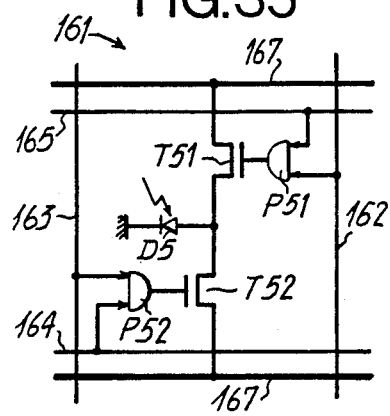

FIG. 35 illustrates a variation in which the addition of a second cell row control bus, bus 164 here, makes it possible to do away with the flip-flops B51 and B52 (FIG. 34) inside each cell 161.

EXAMPLE R8

It was seen in the half-line access multi-channel multi-cell receives described in example R6 how a blockage arises when trying to gain simultaneous access to two cells in the same half-line.

Figure 36:
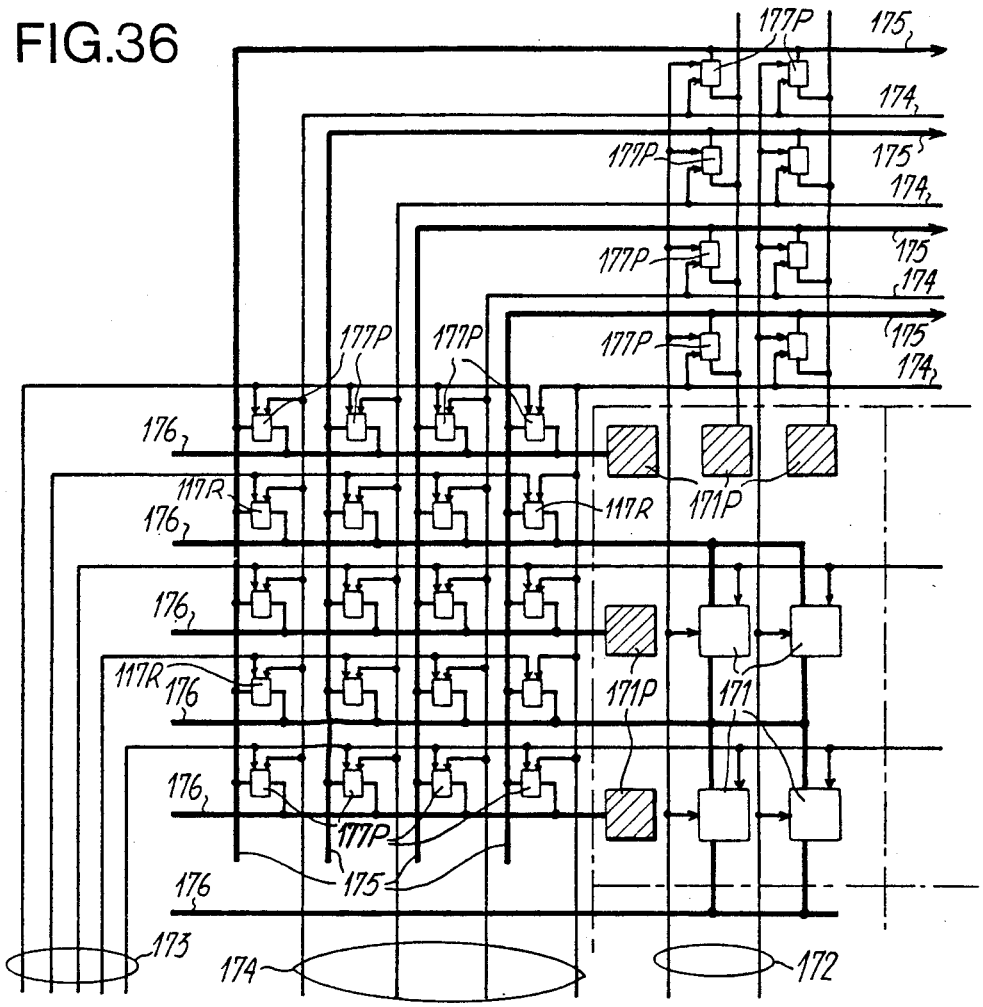

By taking the measures set forth in examples R6 and R7, cell accessibility is proved. The example of receiver embodiment under consideration now (FIGS. 36 and 37) comprises indeed means which allow each cell a half-line to have access to two information buses. Two series of control buses are respectively ascribed to the selection of rows of cells and to selection of columns of cells. Control pulses carrying differing polarities indicate the information bus ascribed to a selected cell. FIG. 36 shows only a quarter of a receiver, where the other three quarters having the same structure but not necessarily the number of cells.

The said receiver comprises a plurality of cells 171, accessible by half-lines and a plurality of cells 171P having individual access. The selection circuit (not shown) delivers its control pulses via series of buses 172, 173 and 174.

A restrictive-access cell (i.e. belonging to a half line) 171 comprises (FIG. 37):

two AND gates P71 and P72 each of which has an input connected to a column control bus 172 and a row control bus 173. The gate P72 input connected to the bus 173 is sensitive, unlike the other inputs, only to negative pulses, two bistable flip-flops B71 and B72 whose inputs are respectively connected to the outputs from the gates P71 and P72, a photodiode D7 whose cathode is taken down to ground, and two switching transistors T71 and T72 which connect the photodiode D7 respectively to the two information buses 176 serving the cell 171 and whose control electrodes are respectively connected to the outputs from the flip-flops B71 and B72.

In this way, if a first control pulse (e.g. positive) is delivered along the bus 172 and if a second control pulse is simultaneously delivered along the bus 173, then two cases can arise:

the second control pulse is positive: the gate P71, via the flip-flop B71, opens the transistor T71 which establishes the connection between the photodiode D7 and the bus 176 directly connected to this transistor T71, the second control pulse is negative: the gate P72, via the flip-flop B72, opens the transistor T72 which establishes the connection between the photodiode D7 and the bus 176 directly connected to this transistor T72.

Figure 27:
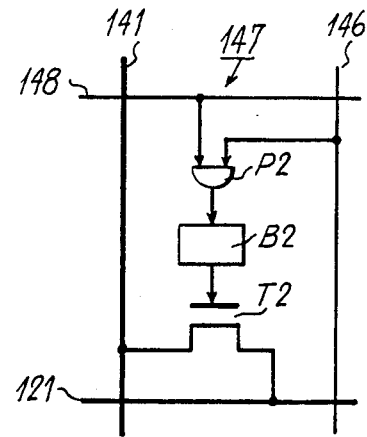

The connections between the buses 176 and the output channels 175 are established by means of a plurality of switches set out in an identical fashion to the switches 145 and 155 in FIGS. 27 and 31. It can be observed on FIG. 36 that some of these switches, marked 177P, are controlled by a bus 172 or 173 for establishing the connection between a peripheral cell 171P and one of the output channels 175. Others, marked 177R, are controlled by a bus 173 for establishing the connection between a half-line information line 176 and one of the output channels 175. In fact, a wide variety of configurations which will not be covered in detail here, are possible. By way of an example, in FIG. 36 the same control bus 172 is used for selecting all the cells in the column (peripheral cell and cells belonging to the same half-line), whereas the same control bus 173 can be used for selecting all the cells lying in the same bus 173 can be used for selecting all the cells lying in the same row whether peripheral or not.

Figure 37:
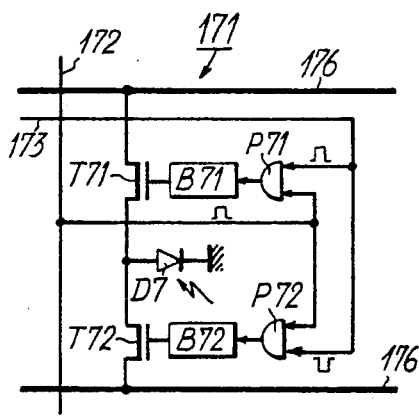
Figure 38:
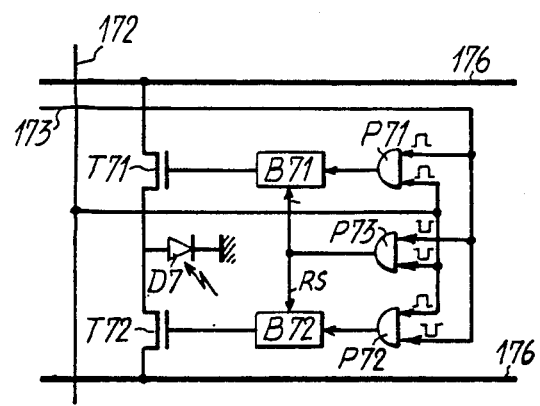

FIG. 38 illustrates a variation of the cell configuration in FIG. 37. An additional AND gate P73, with two inputs sensitive to negative pulses, is also connected to the selection bus conductors 172 and 173. Its output is connected to the inputs RS (reset) of flip-flops B71 and B72. This addition makes it possible to reset these flip-flops, whatever their previous state, by means of negative pulses simultaneously conveyed by the two buses 172 and 173. This precaution can be of use if the flip-flop state is unknown or uncertain, following for example a power-cut or a programming error.

Regardless of the solution adopted, the quadri-channel multi-cell receiver in FIG. 36 makes it possible to serve a subscriber by affording said subscriber, for instance:

a blockage-free access with four programs broadcast by peripheral emitters on the emitter board, a blockage free access with at least two visiophone communications retransmitted by an emitter.

It is of course again possible to increase the number of channels. In this type of structure, a blockage appears only if access is sought to more than (n+1) restrictive-access cells belonging to n consecutive half-lines.

EXAMPLE R9

Figure 39:
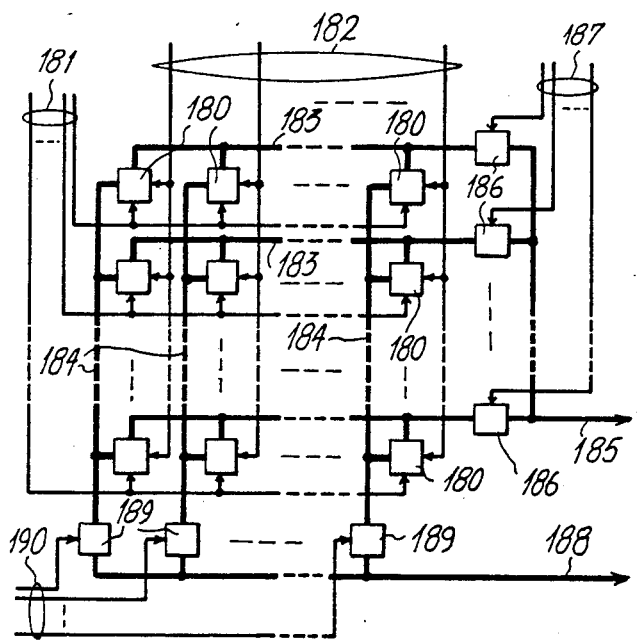
Figure 40:
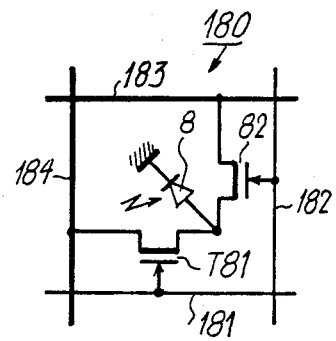

FIGS. 39 and 40 relate to another example of a two-channel multi-cell receiver embodiment with no blockage in accordance with the invention, which differs from example R7 (FIGS. 33, 34 and 35) in that the use of two series of control buses and two series of information buses (i.e. a control bus and an information bus per line of cells as well as per column of cells) makes it possible to use receiver cells with no bistable flip-flops. Each cell 180 comprises two switching transistors T81 and T82 whose control electrodes are connected respectively to a row control bus 181 and a column control bus 182. These two transistors connect a photodiode D8 grounded via its cathode to the column information bus 184 and the row information bus 183 respectively. All the information buses 183 are connected to the output channel 185 by as many switches 186 each of which is controlled via a link 187. All the information buses 184 are connected to the output channel 188 by other switches 189 each of which is controlled via a link 190. The control buses 181 and 182 and control links 187 and 190 convey signals delivered by a selection circuit, not shown.

As a result, the switching of any cell can be performed:

either via the output channel 185 by means of a signal sent simultaneously along a control bus 182 and along a control link 187, or via the output channel 188 by means of a signal sent simultaneously along a control bus 181 and along a control link 190.

EXAMPLE R10

Figure 41:
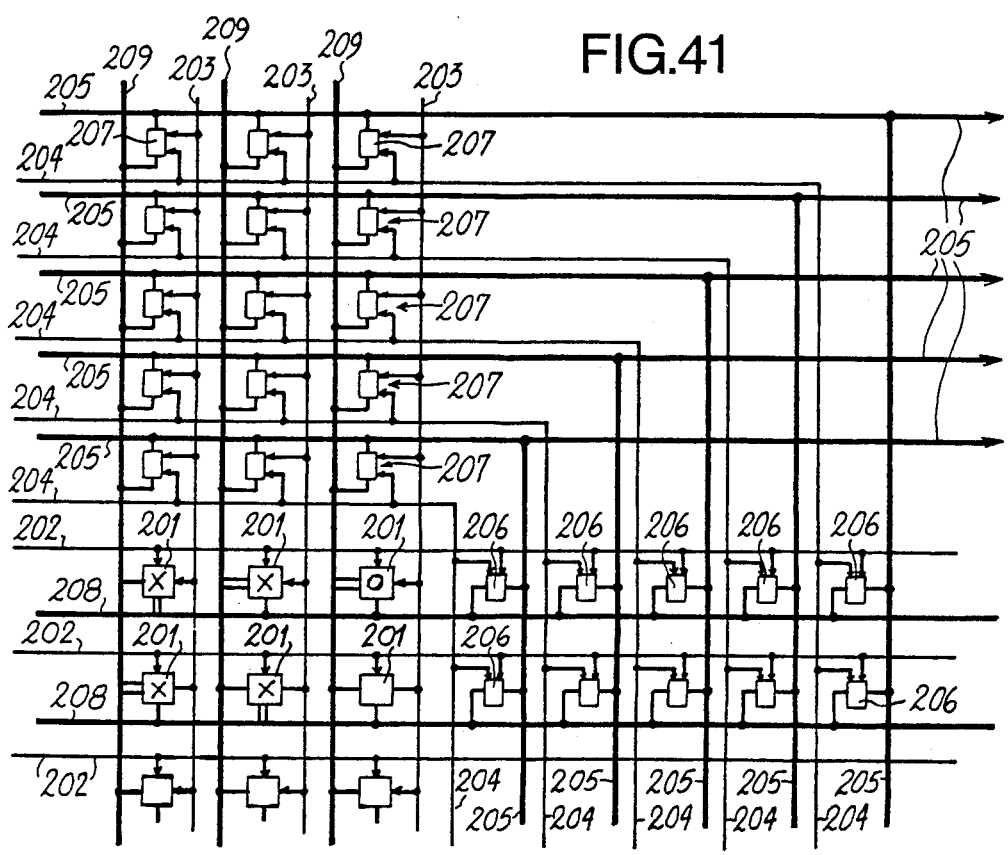

FIG. 41 shows an embodiment example of a five-output-channel multi-cell receiver with no blockage. The cells 201 conform with the lay-out in FIG. 37 or 38. The selection circuit is not shown. It delivers its orders via as many row control buses 202 as there are rows of cells, via as many column control buses 203 as there are columns of cells and via as many channel selection buses 204 as there are output channels 205. The switches 206 and 207 are all as in FIG. 31. Some (206) are aligned in rows which prolong the rows of cells and the others (207) are aligned in columns which prolong the columns of cells. Depending on the polarity of control pulses delivered to de bus 202 and a bus 203 (case of the cell lay-out in keeping with FIGS. 37 and 38) or depending on the number of pulses received, the cell 201 that is positioned at the intersection of these two control buses, is connected to a row information bus 208 or a column information bus 209. Simultaneously, a pulse sent along one of the channel control buses 204, by means of the action of a switch 206 or 207, switches the said information bus to the corresponding output channel 205.

In a multi-channel multi-cell receiver such as this, there is no risk of blockage if the number of output channels is equal to or less than five. Access restrictions appear, however, if the number of output channel exceeds five since the risks of blockage come about once access to more than five neighbouring cells is sought because of the information bus network arrangement.

To illustrate this constraint, examples of possible connections with neighbouring cells have been represented by double lines in the lower left hand part of the drawing. Among the four neighbouring cells 201 marked with a cross, two are switchable respectively to two consecutive row information buses 208 and the other two to two consecutive column information buses 209. A fifth cell marked with a small circle, is switchable to a third column information bus (or a third row information bus). A blockage would occur were an attempt made to switch the sixth cell 201 located below the cell 201 marked with a circle, to a sixth output channel.

Consequently, in a multi-channel multi-cell receiver in keeping with the lay-out in FIG. 41, it is possible to add a sixth channel, a seventh channel, etc . . . providing the risks of blockage are accepted. Having said this, as in some of the previous examples, individual access means can also be added to the peripheral cells. Lastly, to reduce the risks of blockage, a half-line and half-column access can be provided in lieu of a row and a column access (see example R6 and FIG. 30 in this connection).

EXAMPLE R11

Figure 42:
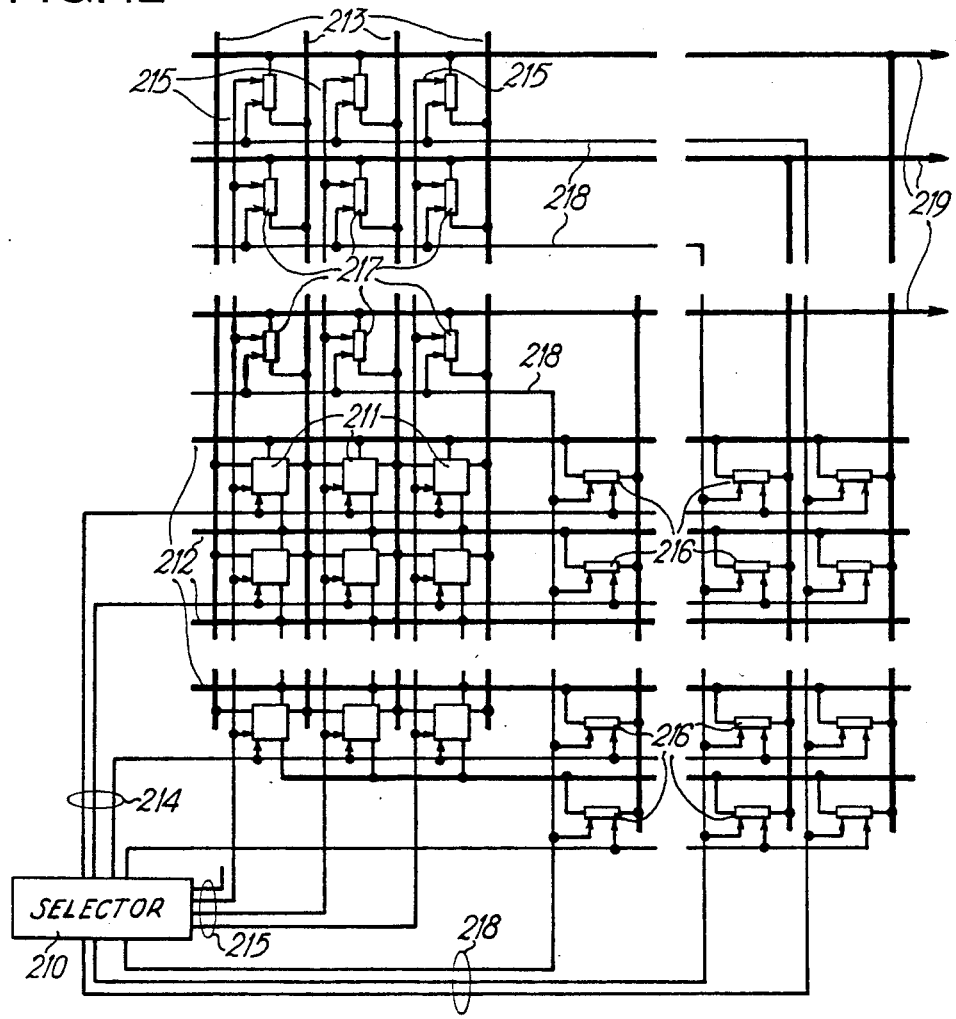

FIG. 42 gives a partial schematization of a multi-cell receiver having eight output channels at the most with no blockage. Each cell 211 is served by four information buses, i.e. the two row information buses 212 which run along either side of it and the two column information buses 213 which do likewise perpendicular to the latter two. As a result, a given bus 212 lying between two cell rows serves these two rows and a given bus 213 lying between two cell columns serves these two columns. The bus 213 lying between two cell columns serves these two columns. The switching control for each cell is ensured via a row control bus 214 and via a column control bus 215. The switches 216 and 217 are designed and arranged as were the switches 206 and 207 in example R10 (FIG. 41) for establishing the connection between one of the information output buses 219 and one on the information buses 212 or 213. They are controlled by a column control bus 214 or a row control bus 215 and in addition by a channel selection bus 218. All the control and selection buses depend on the selection circuit 210.

Figure 43:
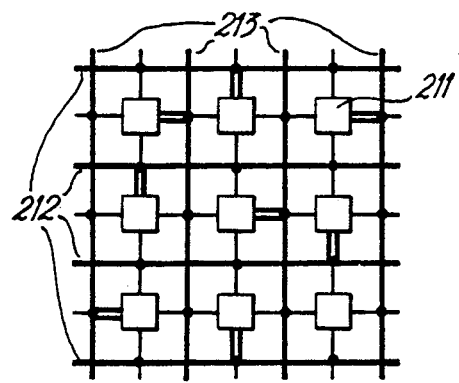

FIG. 43, in which the double lines have the same significance as in FIG. 41, shows that only eight neighbouring cells can be connected to different information buses, thereby limiting the number of output channels 219 to eight of any risk of blockage is to be avoided.

The cells should be designed to be switchable to any one of the four information buses around them (i.e. two buses 212 and two buses 213).

Figure 44:
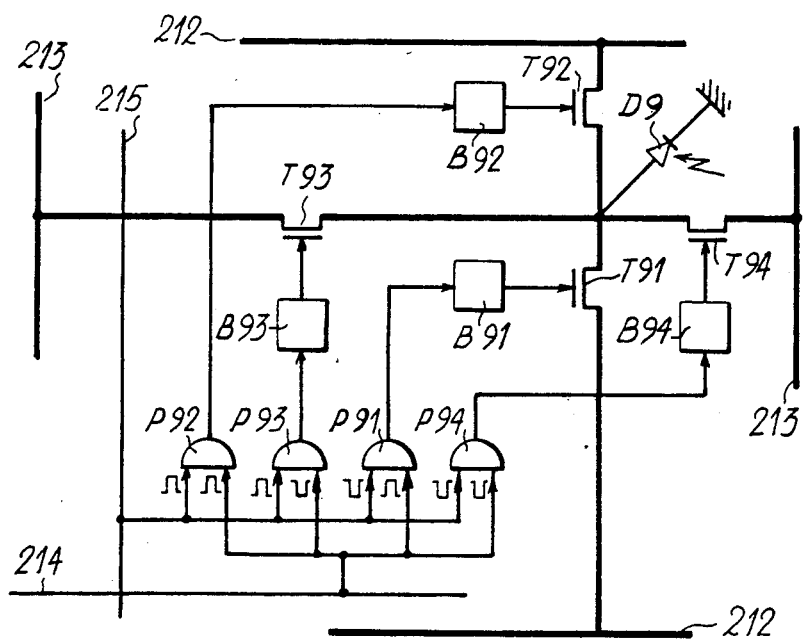

FIG. 44 depicts an embodiment of the selection of the information bus by means of control pulses with different polarities transmitted simultaneously along the control bus 214 and the control bus 215.

The switching transistors T91, T92, T93 and T94 respectively connect the photodiode D9 to the two information buses 212 and the two information buses 213. The photodiode D9 cathode is grounded. The switching order formed of pulses conveyed simultaneously via the control buses 214 and 215, is decoded by the four AND gates P91, P92, P93, P94 that each carry two inputs, each input being sensitive only to one given polarity. The order recognized by one of the gates P91, . . . P94 causes a pulse to be sent to a bistable flip-flop B91, B92, B93, B94 which memorizes the information and switches the transistor T91, T92, T93, T94 in order to connect the photodiode D9 to the information bus 212 br 213 as indicated by the order.

Figure 45:
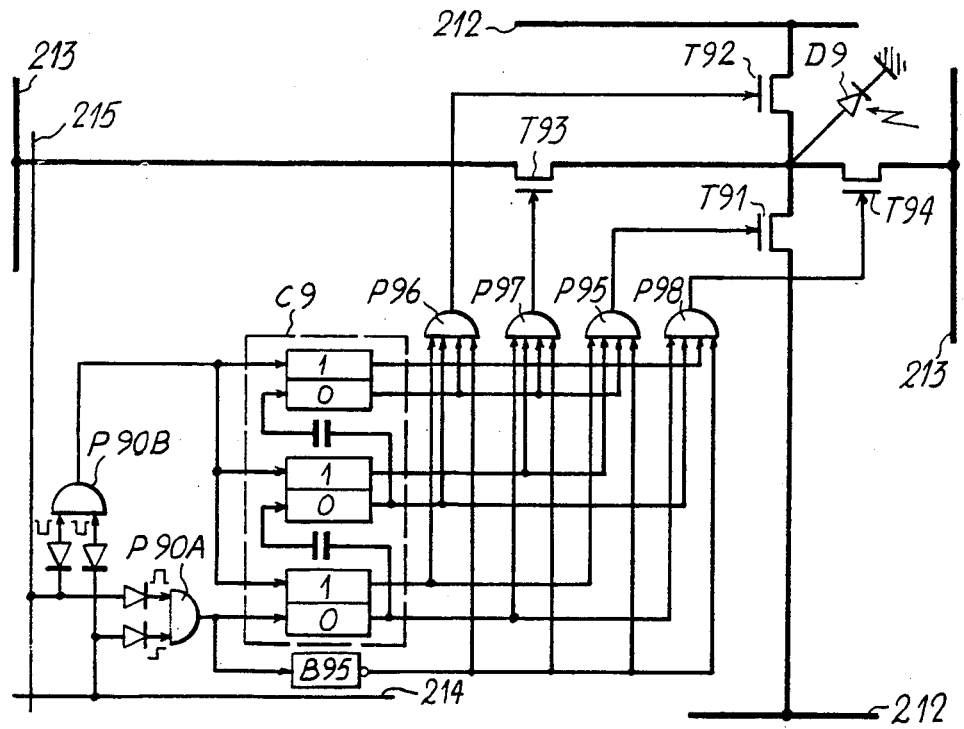

FIG. 45 depicts an example of a cell embodiment in which the information bus selection operation is performed in terms of the number of pulses transmitted along one of the control buses while a D.C. voltage is set on the other. This lay-out uses the control buses 214 and 215, the two row information buses 212, the two column information buses 213, the four switching transistors T91, . . . T94 and the photodiode D9.

The AND gate P90A sensitive to positive pulses, is connected to the two buses 214 and 215 by diodes which transmit it only positive pulses. The AND gate P90B sensitive to negative pulses, is connected to these two buses by diodes which transmit it only the negative pulses. A pulse counter C9, by means of four AND gates P95, ... P98, opens that transistor T91, ... T94 which is indicated by the order. When a negative pulse appears along the two control buses, the counter is reset to zero. A monostable flip-flop B95 whose input is connected to the output from the gate P90A and whose reversing output is connected to inputs of gates P95, ... P98 forbids the transmission of untimely control signals to the switching transistors T91, ... T94 during the pulse counting phase.

The maximum number of output channels, a multi-cell receiver (or emitter) can carry with no risk of blockage depends on the number of information buses per row and per column as well as on the number of these information buses to which each cell has access. The number of control buses per cell and the number of different control signals available along these control buses must of course be such that the cell can recognize the information bus over to which it must switch.

A straightforward calculation indicates, for instance, that:

the use of two information buses per row of cells and two information buses per column of cells, with the possibility of access for each cell to four buses, permits eighteen output channels with no risk of blockage, with the same number of information buses, the possibility for each cell to have access to eight buses would permit twenty-four channels with no blockage.

More generally speaking, if the number of information buses per row and per column is b, then the number of channels offered, with no blockage, is $b(4b+1)$ in the event of each cell having access only to 2b buses and $4b(b+1)$ should each cell have access to the 4b neighbouring cells. Additionally, the risks of blockage by utilizing a greater number of output channels become lower as the number of available channels with no blockage increases.

EXAMPLE R12

Figure 46:
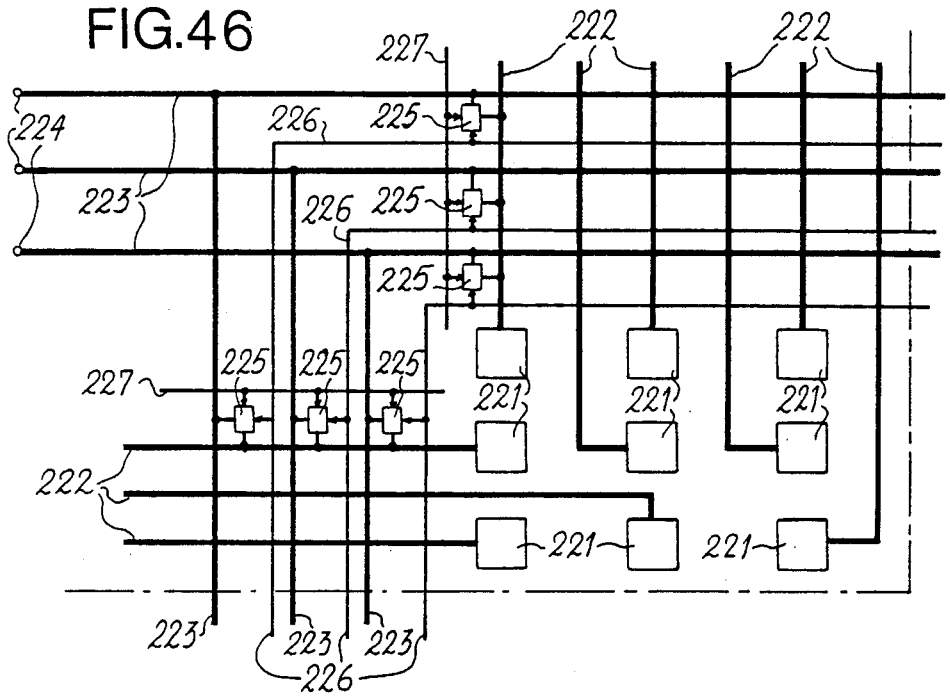

This example together with the following one cover possibility of an embodiment in integrated-circuit form of multi-channel multi-cell receivers with individual access to each cell, where this individual access obviously eliminates any risk of blockage regardless of the number of output channels. FIG. 46 depicts a quadrant of the receiver. The complete receiver may be deduced by rotating the portion shown. It comprises thirty-six cells 221 arranged in six rows and six columns and the drawing thus depicts three half-rows and three half-columns, i.e. nine cells.

Each cell 221 has its own information output link 222. The cell matrix is surrounded by a number n of information output channels 223 each of which is connected to an output terminal 224. Each information link 222's access to each information output channel 223 is achieved via a switch 225 controlled by means of channel selection bus 226, which runs along next to the corresponding information output channel 223 and by means of a cell selector bus 227 which crosses the channels 223 and the buses 226. FIG. 46 shows how it is possible in a planar structure to avoid cross-overs among the information links 222 and to limit the number of conducteurs running between two neighbouring cells to one. This possibility is due to the fact that in a matrix of thirty-six cells the number of intervals between half-rows and half-columns (namely 20) is greater than the number of internal cells.

EXAMPLE R13

Generally speaking, in a square matrix, if R represents the numbers of rows and columns, the number of internal cells is given by $(R-2)^2$ and the total number of intervals between half-rows and between half-columns is $4(R-1)$. Once R exceeds 6, $(R-2)^2 > 4(R-1)$ and in a plane structure, it becomes necessary to feed at least two conductors between certain cells if all are to have individual access.

Figure 47:
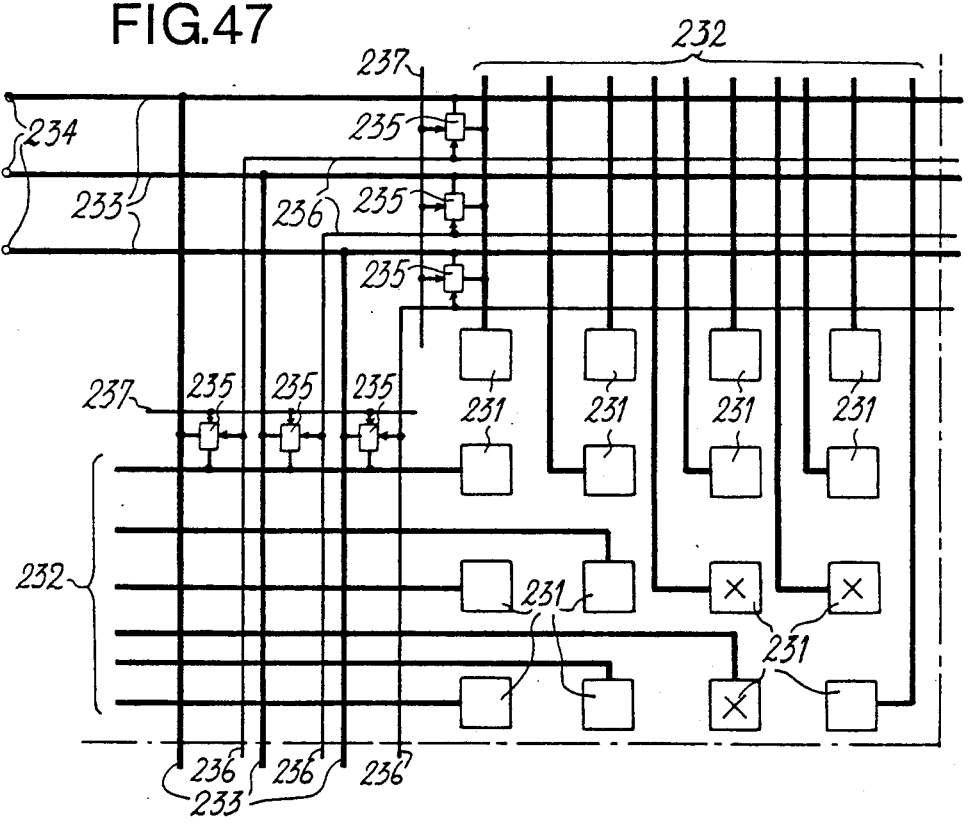

FIG. 47 depicts a cell and conductor lay-out in a receiver having sixty-four cells arranged in eight rows and eight columns. As in FIG. 46, only a quadrant of the receiver has been illustrated where the other three quadrants may be deduced by rotation. The reference numerals ascribed to the cells, buses, etc ... have been obtained by adding ten to the references on the homologous elements in FIG. 46. It can be observed that two cell information output conductors 232 must be fed between certain rows, which may lead to an increased cell pitch or, to avoid increasing this pitch, to laying transparent conductors covering some of the said cells.

A further solution, which complicates the design and assembly of the receivers on the boards, consists of replacing all or part of the conductors laid on the substrate by aerial conductors. In this way, for instance, the outputs from the cells 231 marked with a cross (i.e. twelve cells in all for the entire receiver) can be provided by overhead conductors, whereas the outputs from the remaining fifty-two cells are obtained by means of conductors 232 laid on the substrate. As a result, the number of conductors which run between two neighbouring cells does not exceed one.

EXAMPLE E1

Figure 48:
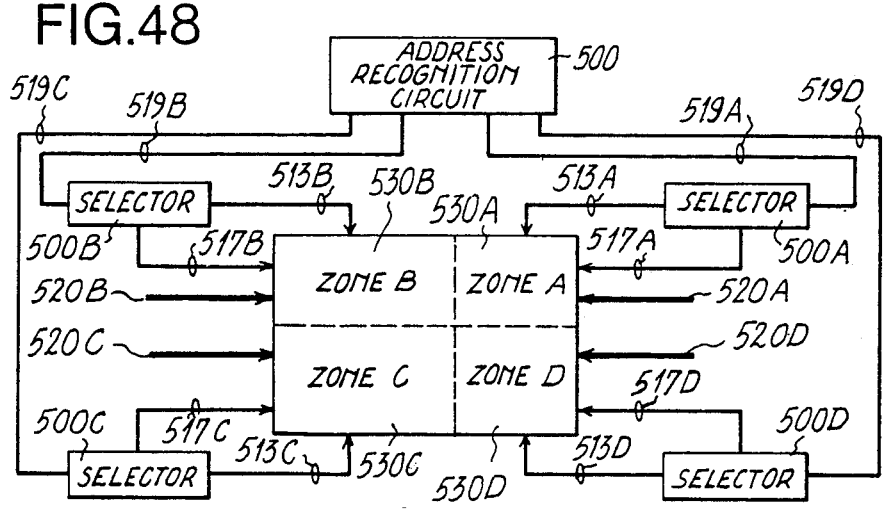
Figure 49:
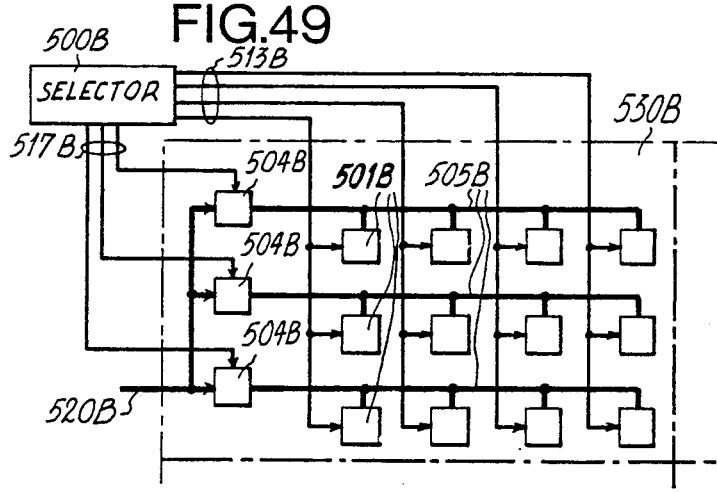
Figure 50:
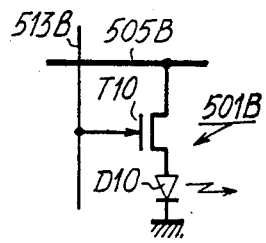

FIGS. 48, 49 and 50 relate to the design of multi-cell emitter in accordance with the invention having four zones (cell sub-assemblies) of elementary emitter cells and four input channels. The cell matrix is split into four equal or unequal zones 530A, 530B, 530C, 530D. Like in example R1 (multi-cell receiver), the control of this emitter is split into 5 circuits 500, 500A, 500B, 500C, 500D which can advantageously reduce the length of the control buses.

Each zone comprises, besides the cells, its selection circuit controlled by the circuit 500, a column control bus, a row information bus and in information input channel. By way of this set up in the zone 530B (which includes the emitter cells 501B, the column control buses 513, the row information buses 505B, the row informatino bus switches 504B and the row control buses 517B), the input signal delivered to the channel 520B is switched toward the cell line 501B selected by means of a switch 504B activated by a row control bus 517B. The switches 504B are field effect switching transistors but can be replaced by any other type of crosspoints compatible with the transmitted information signal bit-rates and the technology brought into play.

A given cell in the indicated row of cells is selected by means of the bus 513B controlling the corresponding column of cells. Each cell 501B comprises (FIG. 50) a switching transistor T10 which, when unblocked, connects the row information bus 505B to the anode of a light-emitting diode D10 whose cathode is grounded. The transistor T10 control electrode is connected to the said bus 513B.

EXAMPLE E2

Figure 51:
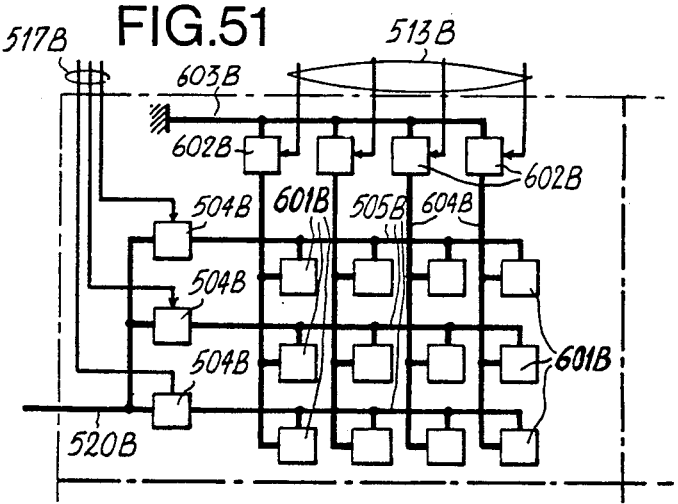
Figure 52:
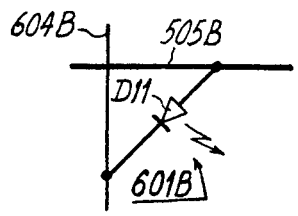

The variation illustrated in FIGS. 51 and 52 maked it possible to avoid having a switching transistor in each cell. The latter is composed of a single light-emitting diode D11 whose anode is directly connected to the corresponding row information bus 505B and whose cathode is directly connected to a column information bus 604B. A column control switch 602B, consisting of a switching transistor which makes it possible to connect the said bus 604B to ground bus 603B when its control electrode receives a signal from one of the column buses 513B, provides the ground connection for all the diodes D11 (cells 601B) in a column. As a result, a row selection signal sent through one of the switches 504B and a column selection signal through one of the switches 602B establishes a circuit between the information input terminal 520B and ground via the cell 601B positioned at the end of the said row and the said column. This variation may exist in integrated-circuit form only providing the emitter cells D11 can be insulated from the substrate.

Numerous analogies exist between the multi-channel multi-cell receiver discussed in example R1 (FIGS. 12 and 13) and the multi-channel multi-cell emitter in example E1 (FIGS. 48, 49 and 50). In actual fact, the emitter differs from the receiver simply along the lines of the following modifications:

elimination of circuits which were intended for reverse polarizing the photodiodes (FIG. 13) and which included terminals such as 102B and resistors such as 103B;

replacement of the photodiode in each cell by a light emitting diode.

The emitter in example E2 differs further from the receiver in example R2 in the elimination of the switching transistor in each cell, the insulation of the cells (light emitting diodes) fro the substrate, the substitution of the column information buses for the column control buses and the addition of switching transistors activated by the column control buses and linking the column information buses to ground.

The control bus network is the same. The cell line information buses are the same except in that they are used in the receiver case for the information output and in the emitter case for the information input. In both cases, these are information conveyance buses which each connect cells to a channel (e.g. 105B in FIG. 13 of example R1 and 505B in FIGS. 49 and 51 of examples E1 and E2).

As an outcome of these analogies, all the characteristic features indicated in examples R2, R3, . . . R13 of multi-channel multi-cell receiver embodiments in accordance with the invention are valid for multi-channel multi-cell emitter embodiment. By way of example, mention may be made of the addition of individual access cells, the use of switching matrices making it possible at will to connect cell zones or individual-access cells to a given channel, etc . . . .

As in the case of the multi-cell emitters of the former art, multi-channel multi-cell emitters such as those described in examples E1 and E2 (FIGS. 48 to 52) make it possible to serve simultaneously with the same program, any number of subscribers connected to the receivers which are conjugated in the conjugated receiver board, with the emitter cells of the same row in the same zone.

In the configuration in FIG. 49 for instance, by controlling switch 504B and all the buses 513B, it is possible to connect all the cells of the row corresponding to the said switch to the channel 502B. In the configuration in FIG. 51, the same result is obtained by controlling a switch 504B and all the switches 602B. The number of subscribers that can therefore be simultaneously served by the same program is limited only by the admissible value for the power dissipated by the cells, which is proportional to the number of cells connected.

EXAMPLE C6

Figure 53:
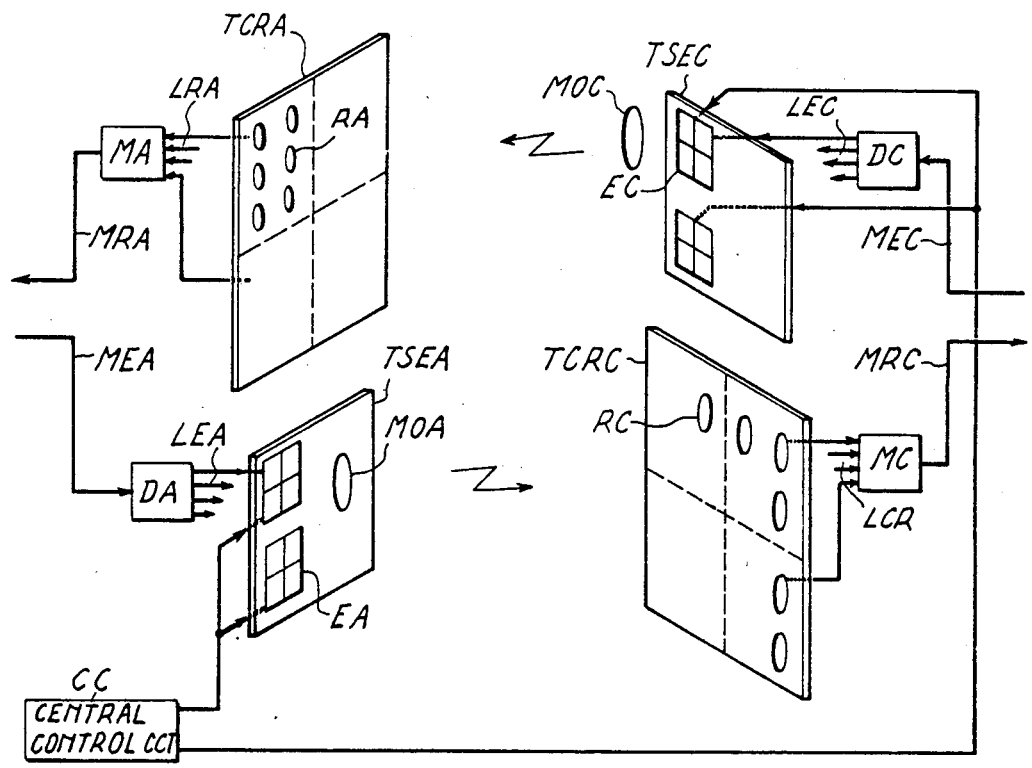
Figure 54:
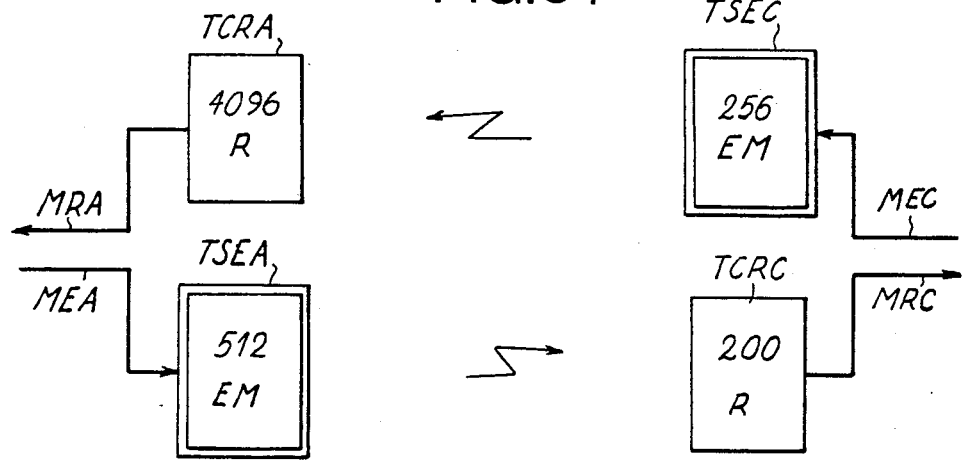

Consideration is now lent to FIGS. 53 and 54 relating to the functional workings of a concentrator made up of two switching systems in accordance with the invention and each of which comprises an emitter selector board and a receiver conjugated board. The two emitter selector boards each essentially comprise an assembly of multi-channel multi-cell emitters in accordance with the aforesaid examples, E1 and E2.

The made-up of these switching systems affords many analogies with that of the receiver selector board switching systems in example C1. Only a succinct description will therefore be made. The switching system ascribed to the "outbound" direction (trunks toward subscriber lines) comprises the emitter selector board TSEC and the receiver conjugated board TCRA. The switching system ascribed to the "in bound" direction (subscriber lines toward the trunks) comprises the emitter selector board TSEA and the receiver conjugated board TCRC. Examples of embodiments covering the central control CC will be found in the patent application No. F 78. 38639 already mentioned.

The concentrator serves 1024 subscribers who each have four outbound channels (4096 RA in the TCRA board with 1024 multiplex links MRA connected through amplifying, multiplexing and light injecting equipment such as MA) and two inbound channels (512 multi-cell emitters EA with four input channels in the board TSEA carrying on optical arrangement MOA and connect to 1024 multiplex links MEA through detecting, amplifying the demultiplexing equipment such as DA).

From the circuitry viewpoint, the receiver board TCRC comprises 200 receivers RC connected to outgoing multiplex links MRC through multiplexing equipment such as MC.

As far as the circuit emitter selector board TSEC is concerned, it comprises 256 quadri-channel multi-cell emitters EC with optics MOC. Along the multiplex links MEC, via demultiplexing equipment such as DC, it receives 420 channels including 170 visiophone channels, 200 video-library channels and 50 television channels.

The way the channels are split among the emitters EMC of the board TSEC is determined in terms of the envisioned traffic. For example:

the visiophone channels are coupled up for per emitter, the television channels, serving on average 20 subscribers per channel (1024 erlang-subscribers for 50 programs), are coupled up to the extent of 1 channel for several emitters, the video-library channels are coupled up either four per emitter (individual services), or 1 channel for several emitters (broadcasting services) or in an intermediate fashion.

According to operational statistics, channels are found linked to one zone of na emitter or two or three emitters, or to two or three zones of the same emitter.

Considering a dominant television station requested for instance by a quarter of the subscribers, i.e. 256, it is assumed that the receiver board is a square matrix having 64 rows and 64 columns in which the 4 receivers offered to a subscriber are consecutively implanted on the same column, where the first of these receivers is reversed for the dominant broadcast programs. The 256 receivers in question are therefore laid out in one row in four, i.e. in 16 row, in which they are randomly spaced out 16 per row on average. A quadri-channel multi-cell emitter of the board TSEC then makes it possible to serve 32 receivers on average taken in two rows of 64. The number of emitters to be connected to the television channel is then 8.

Further connection rules may be easily deduced for other instances of utilization.

There is little point in describing further embodiment examples of emitter selector board switching systems in accordance with the invention since these may easily be deduced from examples C1, ... C4 (FIGS. 14, 15, ... 21, 22) and C5 (FIG. 29) by replacing each receiver selector board by an emitter selector board and each emitter conjugated board by a receiver conjugated board.

For economic and operational reasons, it is obviously desirable to use emitter boards of the same type and receiver boards of the same type in a switching network set-up employing at least two switching systems in accordance with the invention. From a purely technical standpoint however, there is nothing a pronent the use, for instance, of a first switching system comprising a receiver selector board and an emitter conjugated board and a second switching system comprising an emitter selector board and a receiver conjugated board in the design of a concentrator.

What we claim is:

1. An optical switching network for selectively coupling plural input information signals to plural subscriber stations from a multi-service exchange that derives the information signals, the optical switching network comprising an array of optical transmitting cells responsive to said input signals so that an optical signal is derived by one of said cells in response to the information in each information signal, an array of optical receiving cells responsive to the optical signals derived by said transmitting cells, said receiving cell array being divided into plural zones each including at least the same number of cells as in the transmitting cell array, optical projection means between said arrays arranged so there is a correspondence of the information signals from the cells of the transmitting array with cells of each zone in the receiving array, each receiving cell deriving a first signal that represents the optical signal incident thereon, means for selectively coupling the first signals of each zone to a single output so that one output is provided for each zone, and means for combining the outputs of the plural zones onto a single signal transmitting structure that is coupled to the plural subscriber stations.

2. The network of claim 1 wherein the plural input signals are transmitted in multiplexed form on a single input optical transmission line, means for demultiplexing multiplexed signals on the input optical line and for deriving a plurality of electrical signals each of which is separately coupled to only one of said transmitting cells.

3. The network of claim 1 wherein each of the cells of the receiving arrays derives the first signal as a separate electric signal, the means for selectively coupling the first signals of each zone to a single output comprises electric circuit means for supplying the first signals of each zone to a separate electric lead so a separate lead is associated with each zone, means for multiplexing the signals on the separate leads for each zone so the multiplexed signals are converted into optical signals coupled to a single output optical transmission line.

4. The network of claim 1 wherein the plural input signals are transmitted in multiplexed form on a single input optical transmission line, means for demultiplexing multiplexed signals on the input optical line and for deriving a plurality of electrical signals each of which is separately coupled to only one of said transmitting cells, wherein each of the cells of the receiving arrays derives the first signal as a separate electric signal, the means for selectively coupling the first signals of each zone to a single output comprises electric circuit means for supplying the first signals of each zone to a separate electric lead so a separate lead is associated with each zone, means for multiplexing the signals on the separate leads for each zone so the multiplexed signals are converted into optical signals coupled to a single output optical transmission line.

5. An optical switching network for selectively coupling plural input information signals to a multi-service exchange from plural subscriber stations, each of which derives plural information signals, the optical switching network comprising an array of optical transmitting cells responsive to said input signals so that an optical signal is derived by a plurality of said cells in response to the information in the plural information signals for each subscriber station, an array of optical receiving cells responsive to the optical signals derived by said transmitting cells, said receiving cell array being divided into plural zones each including at least the same number of cells as in the transmitting cell array, optical projection means between said arrays arranged so there is a correspondence of the information signals from the cells of the transmitting array with cells of each zone in the receiving array, each receiving cell deriving a first signal that represents the optical signal incident thereon, means for selectively coupling the first signals of each zone to a single output so that one output is provided for each zone, and means for combining the outputs of the plural zones onto a single signal transmitting structure that is coupled to the exchange.

6. The network of claim 5 wherein the plural input signals are transmitted in multiplexed form on a single input optical transmission line, means for demultiplexing multiplexed signals on the input optical line and for deriving a plurality of electrical signals each of which is separately coupled to only one of said transmitting cells.

7. The network of claim 5 wherein each of the cells of the receiving arrays derives the first signal as a separate electric signal, the means for selectively coupling the first signals of each zone to a single output comprises electric circuit means for supplying the first signals of each zone to a separate electric lead so a separate lead is associated with each zone, means for multiplexing the signals on the separate leads for each zone so the multiplexed signals are converted into optical signals coupled to a single output optical transmission line.

8. The network of claim 5 wherein the plural input signals are transmitted in multiplexed form on a single input optical transmission line, means for demultiplexing multiplexed signals on the input optical line and for deriving a plurality of electrical signals each of which is separately coupled to only one of said transmitting cells, wherein each of the cells of the receiving arrays derives the first signal as a separate electric signal, the means for selectively coupling the first signals of each zone to a single output comprises electric circuit means for supplying the first signals of each zone to a separate electric lead so a separate lead is associated with each zone, means for multiplexing the signals on the separate leads for each zone so the multiplexed signals are converted into optical signals coupled to a single output optical transmission line.

9. An optical switching network for selectively coupling plural first input information signals to plural subscriber stations from a multi-service exchange that derives the first information signals, and for selectively coupling plural second input information signals from the subscriber stations to the multi-service exchange, the optical switching network comprising a first array of optical transmitting cells responsive to said first input signals so that an optical signal is derived by one of said cells in response to the information in each of said first input signals, a second array of optical receiving cells responsive to the optical signals derived by said cells of said first array, said second array being divided into plural zones each including at least the same number of cells as in the first array, optical projection means between said first and second arrays arranged so there is a correspondence of the information signals from the cells of the first array with cells of each zone of the second array, each cell of the second array deriving a first signal that represents the optical signal incident thereon, means for selectively coupling the first signals of each zone of the second array to a single first output so that one first output is provided for each zone, and means for combining the outputs of the plural zones of the second array onto a first single signal transmitting structure that is coupled to the plural subscriber stations, a third array of optical transmitting cells responsive to said second input signals so that an optical signal is derived by one of said cells of the third array in response to the information in each of said second input signals, a fourth array of optical receiving cells responsive to the optical signals derived by said cells of the third array, said cells of the fourth array being divided into plural zones, each including at least the same number of cells as in the third array, optical projection means between said third and fourth arrays arranged so there is a correspondence of the information signals from the cells of the third array with cells of each zone in the fourth array, each cell of the fourth array deriving a second signal that represents the optical signal incident thereon, means for selectively coupling the second signals of each zone of the fourth array to a second single output so that one of the second outputs is provided for each zone of the fourth array, and means for combining the outputs of the plural zones of the fourth array onto a second single signal transmitting structure that is coupled to the multi-service exchange.

10. An optical switching network for selectively coupling plural first input information signals to plural subscriber stations from a multi-service exchange that derives the first information signals and for selectively coupling plural second input informtion signals from the subscriber stations to the multi-service exchange, the first signals being first optical signals multiplexed on a first optical transmitting line, the second signals being coupled to the multi-service exchange on a second optical transmitting line, the optical switching network comprising means for demultiplexing the first optical signals and for deriving a separate first electric input signal corresponding to each of the first optical signals, a first array of optical transmitting cells responsive to said first input signals so that an optical signal is derived by one of said cells in response to the information in each of said first input signals, a second array of optical receiving cells responsive to the optical signals derived by said cells of said first array, said second array being divided into plural zones each including at least the same number of cells as in the first array, optical projection means between said first and second arrays arranged so there is a correspondence of the information signals from the cells of the first array with cells of each zone of the second array, each cell of the second array deriving a first signal that represents the optical signal incident thereon, means for selectively coupling the first signals of each zone of the second array to a single first output so that one first output is provided for each zone, and means for combining the outputs of the plural zones of the second array onto a first single signal transmitting structure that is coupled to the plural subscriber stations, a third array of optical transmitting cells responsive to said second input signals so that an optical signal is derived by one of said cells of the third array in response to the information in each of said second input signals, a fourth array of optical receiving cells responsive to the optical signals derived by said cells of the third array, said cells of the fourth array being divided into plural zones, each including at least the same number of cells as in the third array, optical projection means between said third and fourth arrays arranged so there is a correspondence of the information signals from the cells of the third array with cells of each zone in the fourth array, each cell of the fourth array deriving a second signal that represents the optical signal incident thereon, each of the second signals being an electric signal, means for selectively coupling the second signals of each zone of the fourth array to a second single output so that one of the second outputs is provided for each zone of the fourth array, and means for multiplexing and converting the second outputs of the plural zones of the fourth array into a multiplexed optical signal that is coupled to the second optical transmitting line.

* * * * *